(12) United States Patent
Lotan et al.

(10) Patent No.: US 11,067,734 B2
(45) Date of Patent: Jul. 20, 2021

(54) ILLUMINATION DEVICE HAVING A PLURALITY OF DIFFERENT COLORED LEDS COUPLED TO A SOLID WAVEGUIDE

(71) Applicant: JUGANU LTD., Rosh Haain (IL)

(72) Inventors: Ada Lotan, Rosh Haain (IL); Tania Kosoburd, Rosh Haain (IL); Alexander Bilchinsky, Rosh Haain (IL); Eran Ben Shimul, Rosh Haain (IL)

(73) Assignee: JUGANU LTD., Rosh Haain (IL)

( * ) Notice: Subject to any disclaimer, the term of this patent is extended or adjusted under 35 U.S.C. 154(b) by 0 days.

(21) Appl. No.: 16/684,729

(22) Filed: Nov. 15, 2019

(65) Prior Publication Data

US 2020/0158939 A1    May 21, 2020

Related U.S. Application Data

(60) Provisional application No. 62/768,958, filed on Nov. 18, 2018, provisional application No. 62/768,960, filed on Nov. 18, 2018.

(51) Int. Cl.
*G02B 6/10* (2006.01)
*F21V 8/00* (2006.01)
*H05B 45/20* (2020.01)

(52) U.S. Cl.
CPC ......... *G02B 6/0021* (2013.01); *G02B 6/0026* (2013.01); *G02B 6/0031* (2013.01); *G02B 6/0038* (2013.01); *G02B 6/0045* (2013.01); *G02B 6/0065* (2013.01); *G02B 6/0068* (2013.01); *G02B 6/0076* (2013.01); *G02B 6/0088* (2013.01); *H05B 45/20* (2020.01)

(58) Field of Classification Search
CPC .. G02B 6/0003; G02B 6/0026; G02B 6/0011; G02B 6/0031; F21K 9/64; F21V 2200/30
See application file for complete search history.

(56) References Cited

U.S. PATENT DOCUMENTS

| | | | | |
|---|---|---|---|---|
| 5,721,795 A | * | 2/1998 | Pelka | G02B 6/2817 385/37 |
| 6,350,041 B1 | * | 2/2002 | Tarsa | F21V 29/74 362/231 |
| 6,402,339 B1 | * | 6/2002 | Mukogawa | B60Q 3/64 362/184 |

(Continued)

FOREIGN PATENT DOCUMENTS

WO    2018157166 A1    8/2018

OTHER PUBLICATIONS

International Search Report and Written Opinion Corresponding to International Application No. PCT/IB2019/001232 dated Mar. 17, 2020, 9 pages.

*Primary Examiner* — Ismael Negron
(74) *Attorney, Agent, or Firm* — Morgan, Lewis & Bockius LLP

(57) ABSTRACT

An illumination device includes a solid waveguide; a plurality of light emitting diodes emitting light of different colors and arranged to project light into at least one of the surfaces of the waveguide; and one or more phosphor materials for converting light emitted by one of the LEDs from one color to another, such that an out-coupling region of the waveguide outputs a mixture of light from at least some of the LEDs and light converted by the phosphors materials.

20 Claims, 15 Drawing Sheets

(56) References Cited

U.S. PATENT DOCUMENTS

| | | | |
|---|---|---|---|
| 7,316,497 B2* | 1/2008 | Rutherford | H04N 9/315 |
| | | | 348/E9.027 |
| 7,982,229 B2* | 7/2011 | Bechtel | F21K 9/61 |
| | | | 257/98 |
| 8,203,260 B2 | 6/2012 | Li et al. | |
| 8,684,555 B2* | 4/2014 | Hofmann | A61B 1/0684 |
| | | | 362/230 |
| 9,482,937 B2* | 11/2016 | Cheng | G03B 21/2013 |
| 9,810,826 B2* | 11/2017 | Chestakov | G03B 21/16 |
| 10,222,540 B2* | 3/2019 | Hikmet | F21S 43/239 |
| 10,422,942 B2* | 9/2019 | Peeters | G02B 1/02 |
| 10,502,882 B2* | 12/2019 | Sathian | G02B 6/0003 |
| 2017/0315433 A1* | 11/2017 | Ronda | G03B 21/2013 |
| 2019/0332098 A1 | 10/2019 | Kachun et al. | |
| 2019/0373700 A1 | 12/2019 | Meir | |

\* cited by examiner

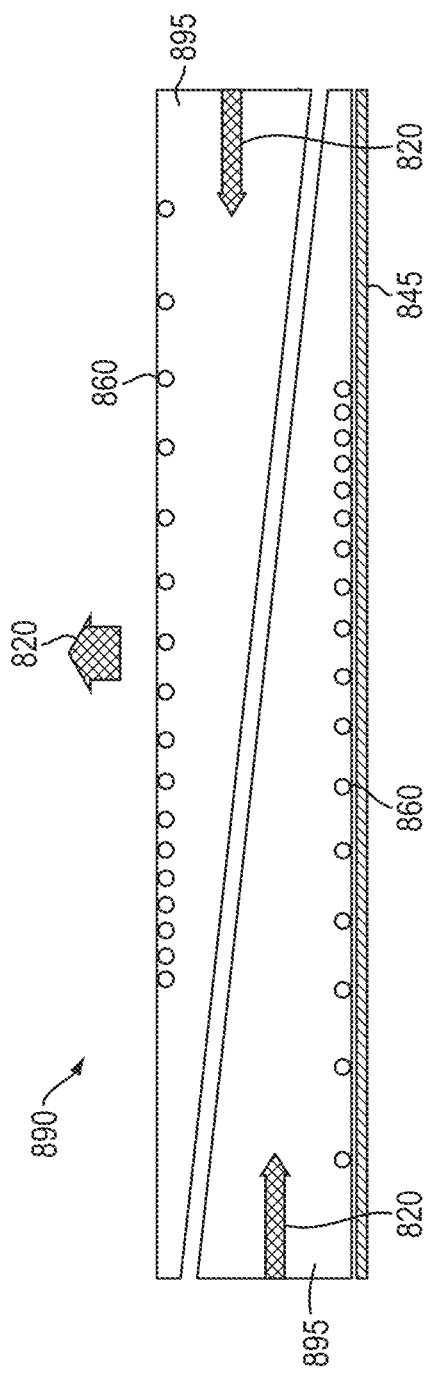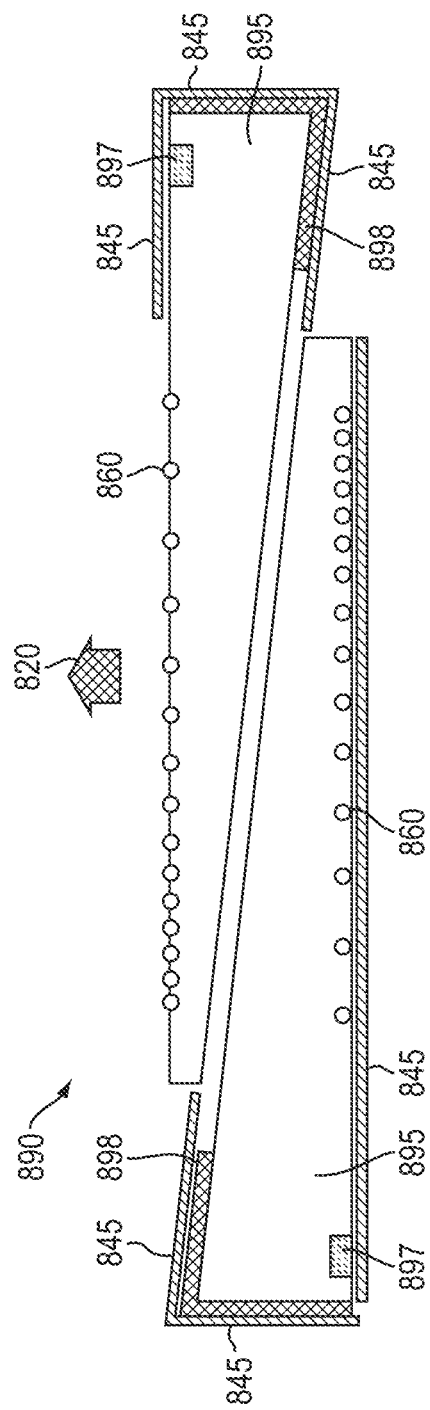

ILLUMINATION DEVICE HAVING A PLURALITY OF DIFFERENT COLORED LEDS COUPLED TO A SOLID WAVEGUIDE

RELATED APPLICATIONS

This application claims the benefit of and priority to U.S. Provisional Patent Application No. 62/768,958, filed Nov. 18, 2018, and U.S. Provisional Patent Application No. 62/768,960, filed Nov. 18, 2018, the entire disclosure of each of which is hereby incorporated herein by reference.

FIELD OF THE INVENTION

In various embodiments, the present invention relates generally to adjustable light illumination devices, and in various embodiments more specifically to illumination devices featuring light-emitting diodes (LEDs).

BACKGROUND

An increasing number of light fixtures utilize LEDs as light sources due to their lower energy consumption, smaller size, improved robustness, and longer operational lifetime relative to conventional filament-based light sources. Conventional LEDs emit light at a particular wavelength, ranging from, for example, red to blue or ultraviolet (UV) light. However, for purposes of general illumination, the monochromatic emitted light by LEDs is typically converted to broad-spectrum white light.

Conventional white LEDs are typically constructed as phosphor-converted LEDs in which a blue LED is covered with a phosphor coating that converts a portion of the emitted blue light to yellow light so as to create white light. The photometric characteristics of the emitted light, such as a color correlated temperature (CCT) value or chromaticity coordinates in the CIE 1931 color space, or the color rendering index (CRI) are generally fixed. While such conventional LED lighting devices may be suitable for some uses, commercial establishments may have different demands—e.g., preferring the properties of the light to change throughout the day along with the circadian rhythm of individuals (e.g., employees, customers, etc.) exposed to the light. For example, the CCT of the white light may desirably be lower in the late evenings to facilitate a healthy sleep cycle and higher in the afternoon to combat afternoon fatigue.

In addition, it has become increasingly desirable to be able to reduce the amount of blue light (e.g., light having a wavelength below 500 nm or, as a specific example, ranging from 440 nm to 480 nm) that reaches the eye of observers, particularly at night. Excess blue light can lead to eyestrain, increase the risk of ocular maladies such as macular degeneration, and even affect circadian rhythms due to nighttime exposure.

In view of the foregoing, there is a need for illumination systems and methods that utilize LEDs and that can emit light with adjustable properties such as CCT.

SUMMARY

In accordance with certain embodiments of the present invention, one or more optical properties, such as CCT, are adjusted in an illumination system incorporating one or more phosphor-converted LEDs. For example, in various embodiments the phosphor of an LED may be replaced with a different phosphor (i.e., a phosphor converting light from the LED to a different phosphor-converted wavelength), and/or one or more properties of the phosphor (e.g., thickness and/or concentration) may be altered to facilitate emission of light having one or more different optical properties. For example, the emitted light may be adjusted from one point on the Planck locus curve of a chromaticity diagram (e.g., the CIE 1931 chromaticity diagram) to another, thereby enabling emission of white light having different optical properties (e.g., CCT) from the illumination device.

In various embodiments, the light emitted by the illumination system may be further adjusted utilizing one or more additional LEDs emitting light of one or more different wavelengths. The adjustment of the relative intensity of the light emitted from the various LEDs enables the emission of light having different optical properties. In various embodiments, the light from the additional LEDs may be of the same color (e.g., blue light) while not being wavelength-converted by the phosphor material.

Embodiments of the invention also include illumination devices in which LEDs emitting light of different wavelengths are coupled to a solid waveguide in different manners to enable only desired interactions between LED light and one or more phosphor materials in the illumination device. For example, various LEDs may be embedded within, and thus in optical contact with, the waveguide, while other LEDs may be butt-coupled, and thus not in optical contact with, the waveguide. One or more phosphor materials may be positioned on and/or within the waveguide so as to preferentially interact with (i.e., wavelength-convert light from) one or more particular LEDs. For example, the phosphor material may be positioned such that light from one or more LEDs does not propagate directly to the phosphor material or is prevented from interacting with the phosphor material (due to, e.g., lack of optical contact between the phosphor material and the waveguide). In such embodiments, relative control of the emission intensity of the LED(s) that are wavelength-converted by the phosphor material and of the LED(s) that are not wavelength-converted by the phosphor material enables selection of one or more optical properties (e.g., CCT) of mixed light emitted from the illumination device.

In additional embodiments of the present invention, illumination devices feature multiple different waveguides each configured (e.g., shaped and/or equipped with out-coupling elements) to preferentially out-couple light from a particular source, of a particular color and/or peak wavelength, and/or propagating in a particular direction within the device. In exemplary embodiments, multiple wedge-shaped waveguides may be utilized in the device, and light out-coupled from the waveguides forms desired (e.g., white) light having high levels of uniformity.

In an aspect, embodiments of the invention feature a method of adjusting the correlated color temperature (CCT) of white light emitted by an illumination device. The illumination device includes, consists essentially of, or consists of (i) a first blue light-emitting diode (LED) configured to emit blue light and (ii) a first phosphor material configured to convert a portion of light emitted by the blue LED to light of a first wavelength, such that mixed light emitted by the illumination device has a first CCT falling on a Planck locus curve on the CIE 1931 chromaticity diagram. The first phosphor material is replaced with a second phosphor material configured to convert a portion of light emitted by the blue LED to light of a second wavelength different from the first wavelength. The thickness and/or concentration of the second phosphor material is adjusted, and/or light output from a second blue LED configured to emit unconverted blue light (i.e., light unconverted by a phosphor material) is adjusted, such that the mixed light emitted by the illumination device has a second CCT, different from the first CCT, falling on the Planck locus curve on the CIE 1931 chromaticity diagram.

Embodiments of the invention may include one or more of the following in any of a variety of combinations. The second wavelength may be shorter than the first wavelength. The second wavelength may be longer than the first wavelength. The second CCT may be larger than the first CCT. The second CCT may be smaller than the first CCT.

In another aspect, embodiments of the invention feature a method of adjusting the correlated color temperature (CCT) of white light emitted by an illumination device. The illumination device includes, consists essentially of, or consists of (i) a first blue light-emitting diode (LED) configured to emit blue light, (ii) a phosphor material configured to convert a portion of light emitted by the blue LED to light of a first wavelength, and (iii) a second LED configured to emit light having a wavelength longer than the blue light emitted by the first blue LED, such that mixed light emitted by the illumination device has a first CCT falling on a Planck locus curve on the CIE 1931 chromaticity diagram. The thickness and/or concentration of the phosphor material is adjusted, and/or light output from a second blue LED configured to emit unconverted blue light (i.e., light unconverted by a phosphor material) is adjusted. The ratio of an intensity of blue light emitted by the first blue LED to an intensity of light emitted by the second LED is adjusted, such that the mixed light emitted by the illumination device has a second CCT, different from the first CCT, falling on the Planck locus curve on the CIE 1931 chromaticity diagram.

Embodiments of the invention may include one or more of the following in any of a variety of combinations. The second CCT may be larger than the first CCT. The second CCT may be smaller than the first CCT. Adjusting the ratio of intensities of blue light to red light may include, consist essentially of, or consist of adjusting drive current supplied to the first blue LED and/or drive current supplied to the second LED. The second LED may include, consist essentially of, or consist of a red LED configured to emit red light.

In yet another aspect, embodiments of the invention feature a method of adjusting the correlated color temperature (CCT) of light emitted by an illumination device. The illumination device includes, consists essentially of, or consists of (i) a first light-emitting diode (LED) configured to emit light having a first peak wavelength, (ii) a phosphor material configured to convert a portion of light emitted by the first LED to light of a different wavelength, such that mixed light emitted by the first LED and the phosphor material has a first CCT not on a Planck locus curve on the CIE 1931 chromaticity diagram, and (iii) a second LED configured to emit light having a second peak wavelength different from the first peak wavelength. Light output from the second LED is adjusted, relative to light output from the first LED, such that mixed light emitted by the illumination device has a second CCT falling on the Planck locus curve on the CIE 1931 chromaticity diagram.

Embodiments of the invention may include one or more of the following in any of a variety of combinations. The first and second peak wavelengths may be different wavelengths of blue light. The illumination device may include a third LED configured to emit light having a third peak wavelength different from the first and second peak wavelengths. The CCT of light emitted by the illumination device may be adjusted by adjusting light output from the third LED relative to light outputs of the first and second LEDs. The third peak wavelength may be a wavelength of red light. The difference between the first and second peak wavelengths may range between approximately 20 nm and approximately 50 nm. The second peak wavelength may be approximately equal to a local minimum in a spectrum of the mixed light emitted by the first LED and the phosphor material.

In another aspect, embodiments of the invention feature an illumination device that includes, consists essentially of, or consists of a solid waveguide, a first LED, a second LED, a first phosphor material, and a second phosphor material. The waveguide has a first surface, a second surface opposite the first surface, and a third surface spanning the first and second surfaces. The first LED is configured to emit light of a first wavelength and embedded within the waveguide proximate the first surface, such that light from the first LED is coupled into the first surface of the waveguide. The second LED is configured to emit light of a second wavelength, different from the first wavelength, and butt-coupled to the third surface of the waveguide, such that light from the second LED is coupled into the third surface of the waveguide. The first phosphor material is configured to convert light from the first LED to light of a different wavelength. The first phosphor material is disposed on the second surface of the waveguide. The second phosphor material is configured to convert light from the first LED to light of a different wavelength. The second phosphor material is disposed on the third surface of the waveguide. The waveguide has an out-coupling region from which mixed light is emitted. The mixed light including, consisting essentially of, or consisting of light emitted from the second LED and light wavelength-converted by the first and second phosphor materials.

Embodiments of the invention may include one or more of the following in any of a variety of combinations. The first and second wavelengths may be different wavelengths of blue light. The first phosphor material may not be in optical contact with the second surface of the waveguide. The second phosphor material may be in optical contact with the third surface of the waveguide. A filter (e.g., an optical band-pass filter) may be disposed between the second LED and the waveguide. The filter may be configured to transmit light of the second wavelength while reflecting one or more other wavelengths of light. A reflector may be disposed within the waveguide. The reflector may be positioned to prevent light emitted by the first LED from propagating away from the first phosphor material or the second phosphor material. The first and second phosphor materials may include, consist essentially of, or consist of the same phosphor material. The device may include one or more third LEDs each configured to emit light of a third wavelength different from the first and second wavelengths. The mixed light emitted from the out-coupling region may include light from the one or more third LEDs. The third wavelength may be a wavelength of red light. The one or more third LEDs may each be butt-coupled to the third surface of the LED. The out-coupling region may be a portion of the second surface of the waveguide.

In yet another aspect, embodiments of the invention feature an illumination device that includes, consists essentially of, or consists of a solid waveguide, a first LED, a first phosphor material, a second LED, and a prism. The waveguide has a first surface, a second surface opposite the first surface, and a third surface spanning the first and second surfaces. The first LED is configured to emit light of a first wavelength and positioned such that light from the first LED is coupled into the first surface of the waveguide. The first phosphor material is configured to convert light from the first LED to light of a different wavelength. The first phosphor material is disposed on the second surface of the waveguide. The second LED is configured to emit light of a second wavelength, different from the first wavelength. The second LED is positioned such that light from the second LED is coupled into the first surface of the waveguide. The prism is disposed at the second surface of the waveguide and positioned to reflect at least some of the light emitted by the second LED away from the first phosphor material while not reflecting light emitted by the first LED away from the first phosphor material. The waveguide has an out-coupling region from which mixed light is emitted. The mixed light includes, consists essentially of, or consists of light emitted from the second LED and light wavelength-converted by the first phosphor material.

Embodiments of the invention may include one or more of the following in any of a variety of combinations. The first and second wavelengths may be different wavelengths of blue light. The first phosphor material may not be in optical contact with the second surface of the waveguide. The first phosphor material may be in optical contact with the second surface of the waveguide. A second phosphor material may be disposed on the third surface of the waveguide. The second phosphor material may be configured to convert light from the first LED to light of a different wavelength. The out-coupling region may be a portion of the second surface of the waveguide. The first LED and/or the second LED may be embedded within the waveguide.

In another aspect, embodiments of the invention feature an illumination device that includes, consists essentially of, or consists of a solid waveguide, a first LED, a prism, and a plurality of second LEDs. The waveguide has a first surface, a second surface opposite the first surface, and a third surface spanning the first and second surfaces. The first LED is configured to emit light of a first wavelength and embedded within the waveguide proximate the first surface, such that light from the first LED is coupled into the first surface of the waveguide. The prism is disposed proximate the second surface of the waveguide above the first LED. The prism reflects light emitted by the first LED into the waveguide. Each second LED is butt-coupled to the third surface of the waveguide, such that light from each second LED is coupled into the third surface of the waveguide. The waveguide has an out-coupling region from which mixed light is emitted. The mixed light includes, consists essentially of, or consists of light emitted from the first LED and the plurality of second LEDs.

Embodiments of the invention may include one or more of the following in any of a variety of combinations. The first wavelength may be a wavelength of blue light. The plurality of second LEDs may emit white light. The second surface of the waveguide may be circular.

In yet another aspect, embodiments of the invention feature an illumination device that includes, consists essentially of, or consists of a first solid, wedge-shaped waveguide, a second solid, wedge-shaped waveguide, a first LED, and a second LED. The first waveguide has a first surface, a second surface opposite and not parallel to the first surface, and third and fourth surfaces spanning the first and second surfaces. The third surface is longer than the fourth surface. The second waveguide has a first surface, a second surface opposite and not parallel to the first surface, and third and fourth surfaces spanning the first and second surfaces. The third surface is longer than the fourth surface. The second surface of the second waveguide faces the second surface of the first waveguide. The first LED is positioned such that light from the first LED is coupled into the third surface of the first waveguide. The second LED is positioned such that light from the second LED is coupled into the third surface of the second waveguide. Mixed light is emitted from (i) at least a portion of the first surface of the first waveguide and/or (ii) at least a portion of the first surface of the second waveguide. The mixed light includes, consists essentially of, or consists of light emitted by the first LED and light emitted by the second LED.

Embodiments of the invention may include one or more of the following in any of a variety of combinations. The second surface of the first waveguide and/or the second surface of the second waveguide may be curved. The second surface of the first waveguide and/or the second surface of the second waveguide may be planar. The first LED may be configured to emit blue light. The second LED may be configured to emit white light. The first LED and the second LED may be configured to emit white light. A reflector may be disposed over at least a portion of the first surface of the first waveguide. The reflector may prevent light emission through the at least a portion of the first surface of the first waveguide. A first plurality of out-coupling elements configured to out-couple light from the first LED from the first waveguide may be disposed within and/or on the first waveguide. A second plurality of out-coupling elements configured to out-couple light from the second LED from the second waveguide may be disposed within and/or on the second waveguide. Lengths of the first surfaces of the first and second waveguides may be approximately equal to each other. The second surfaces of the first and second waveguides may fully overlap each other such that no portion of the second surface of either waveguide protrudes beyond the third surface of the other waveguide.

In another aspect, embodiments of the invention feature an illumination device that includes, consists essentially of, or consists of a first solid, wedge-shaped waveguide, a second solid, wedge-shaped waveguide, a first LED, and a second LED. The first waveguide has a first surface, a second surface opposite and not parallel to the first surface, and third and fourth surfaces spanning the first and second surfaces. The third surface is longer than the fourth surface. The second waveguide has a first surface, a second surface opposite and not parallel to the first surface, and third and fourth surfaces spanning the first and second surfaces. The third surface is longer than the fourth surface. The second surface of the second waveguide faces the second surface of the first waveguide. The first and second waveguides only partially overlap, such that a portion of the second surface of the first waveguide protrudes beyond the third surface of the second waveguide and a portion of the second surface of the second waveguide protrudes beyond the third surface of the first waveguide, thereby forming (a) a non-overlapped portion of the first waveguide, (b) a non-overlapped portion of the second waveguide, and (c) an overlap region disposed therebetween. The first LED is positioned such that light from the first LED is coupled into the first surface of the first waveguide. The second LED is positioned such that light from the second LED is coupled into the first surface of the second waveguide. Mixed light is emitted at the overlap region. The mixed light includes, consists essentially of, or consists of light emitted by the first LED and light emitted by the second LED.

Embodiments of the invention may include one or more of the following in any of a variety of combinations. The first LED may be configured to emit blue light. The second LED may be configured to emit white light. The first LED and the second LED may be configured to emit white light. The device may include one or more reflectors each disposed over at least a portion of the non-overlapped portion of the first waveguide and/or the non-overlapped portion of the second waveguide. The first LED may be embedded within the first waveguide. The second LED may be embedded within the second waveguide. A first phosphor material may be disposed in or on a portion of the first waveguide. The first phosphor material may be configured to convert at least a portion of light emitted by the first LED to light of a different wavelength. The first phosphor material may be disposed only in or on the non-overlapped portion of the first waveguide. A second phosphor material may be disposed in or on a portion of the second waveguide. The second phosphor material may be configured to convert at least a portion of light emitted by the second LED to light of a different wavelength. The second phosphor material may be disposed only in or on the non-overlapped portion of the second waveguide.

In yet another aspect, embodiments of the invention feature an illumination device that includes, consists essentially of, or consists of a solid, wedge-shaped waveguide, a first LED, and a second LED. The waveguide has a first surface, a second surface opposite and not parallel to the first surface, and third and fourth surfaces spanning the first and second surfaces. The third surface is longer than the fourth surface. The first LED is positioned such that light from the first LED is coupled into the third surface of the waveguide. The second LED is positioned such that light from the second LED is coupled into the fourth surface of the waveguide. Mixed light is emitted from at least a portion of the second surface of the waveguide. The mixed light includes, consists essentially of, or consists of light emitted by the first LED and light emitted by the second LED.

Embodiments of the invention may include one or more of the following in any of a variety of combinations. A plurality of out-coupling elements may be disposed proximate or on the first surface of the waveguide. The size, density, and/or concentration of the out-coupling elements may increase as a function of distance away from the third surface of the waveguide. The first LED may be configured to emit blue light or white light. The second LED may be configured to emit blue light or white light. The device may include a plurality of wavelength-dependent out-coupling elements configured to preferentially out-couple light from the second LED. The size, density, and/or concentration of the wavelength-dependent out-coupling elements may increase as a function of distance away from the fourth surface of the waveguide. The plurality of wavelength-dependent out-coupling elements may be disposed within a film or layer disposed on at least a portion of the second surface of the waveguide. The plurality of wavelength-dependent out-coupling elements may be disposed within the waveguide. The plurality of wavelength-dependent out-coupling elements may be disposed proximate or on the first surface of the waveguide. The device may include an optical filter (e.g., an optical band-pass filter) disposed over at least a portion of the first surface of the waveguide. The optical filter may be configured to transmit light from the second LED and reflect light from the first LED. A plurality of out-coupling elements may be disposed beneath the optical filter. The size, density, and/or concentration of the out-coupling elements may increase as a function of distance away from the fourth surface of the waveguide. The device may include a light-redirection element configured to alter a propagation angle of the mixed light. The light-redirection element may be disposed over at least a portion of the second surface of the waveguide.

In another aspect, embodiments of the invention feature an illumination device that includes, consists essentially of, or consists of a solid waveguide, a first illumination module, and a second light source. The waveguide has a first surface, a second surface opposite the first surface, and a third surface spanning the first and second surfaces. The first illumination module is positioned such that light from the first illumination module is coupled into the waveguide. The light from the first illumination module includes, consists essentially of, or consists of white light having a first color correlated temperature (CCT) value. The first illumination module includes, consists essentially of, or consists of a first plurality of LEDs embedded within a first phosphor material. The second light source is positioned such that light from the second light source is coupled into the waveguide. The waveguide has an out-coupling region from which mixed light is emitted. The out-coupling region includes, consists essentially of, or consists of at least a portion of the second surface of the waveguide. The mixed light includes, consists essentially of, or consists of light emitted from the first illumination module and light emitted from the second light source. The mixed light is white light having a second CCT value different from the first CCT value.

Embodiments of the invention may include one or more of the following in any of a variety of combinations. The second light source may include, consist essentially of, or consist of a second illumination module. The second illumination module may include, consist essentially of, or consist of a second plurality of LEDs embedded within a second phosphor material. The first and second phosphor materials may be the same phosphor material or different phosphor materials. The second light source may include, consist essentially of, or consist of an LED embedded within the waveguide. The second light source may be configured to emit blue light. The first illumination module may be positioned such that light from the first illumination module is coupled into the first surface of the waveguide. The second light source may be positioned such that light from the second light source is coupled into the second surface of the waveguide. The first illumination module may be positioned such that light from the first illumination module is coupled into the second surface of the waveguide. The second light source may be positioned such that light from the second light source is coupled into the first surface of the waveguide. The first illumination module may be positioned such that light from the first illumination module is coupled into the third surface of the waveguide. The second light source may be positioned such that light from the second light source is coupled into the first surface of the waveguide.

The term "color" (and references to a particular color such as "red" or "blue") is used herein to denote the monochromatic or peak wavelength (or wavelengths) of light emitted by one or more LEDs. In addition, the term "uniform," as used herein, refers to a light intensity distribution whose lower and upper intensity limits are within a factor of four, preferably within a factor of two of each other. It is to be understood that a "wavelength" or "color" of light emitted by an LED refers to the peak wavelength or primary color within the spectrum of light emitted by the LED. For example, a "blue" LED may have a blue-light peak emission wavelength, but the emission spectrum may include other wavelengths being emitted at lesser intensities, as the emission spectrum does not correspond to a delta function at the peak wavelength. Moreover, different LEDs referred to as emitting a particular color (e.g., blue) may have different peak wavelengths within the wavelength range defined by that color. For example, "blue" may apply to wavelengths ranging from approximately 440 nm to approximately 485 nm, and "red" may apply to wavelengths ranging from approximately 625 nm to approximately 740 nm.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. As used herein, the terms "about," "approximately," and "substantially" mean±10%, and in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 8E is a schematic cross-sectional view of an illumination system in accordance with various embodiments of the invention;

FIG. 8F is a schematic cross-sectional view of an illumination system in accordance with various embodiments of the invention;

DETAILED DESCRIPTION

Embodiments of the present invention include planar illumination devices in which LED light is coupled into a waveguide, at least partially color-converted if necessary or desired, and then emitted from the waveguide across a planar area, as well as fabrication and design methodologies for such devices. These planar illumination devices are particularly useful for backlighting for displays and for general illumination (e.g., luminaires or other light fixtures). In various planar illumination devices, light is coupled into the waveguide from the side or the bottom of the waveguide and then redirected out of the waveguide (e.g., from the top of the waveguide). In various embodiments, illumination devices (especially for general illumination) utilize white LEDs as the light source, while in other embodiments (especially for backlighting) red, green, and blue (i.e., RGB) LEDs are used. In various embodiments, other combinations of LEDs may be utilized, for example (i) red, green, blue, and amber (or "RGBA"), which may increase the number of possible emission colors and/or for increasing CRI, or (ii) one or more white LEDs with one or more red LEDs for increasing CRI and/or R9 (which is a component of the CRI). In general, increasing CRI may reduce the efficiency of LED-based illumination devices and, thus, one may increase efficiency by reducing CRI on occasion.

In illumination systems in accordance with embodiments of the present invention, to enable tuning of the light color, the CCT, and/or the CRI, additional LEDs may be added to the device. The additional LED (or LEDs) may be: (i) a new LED (or LED color) that is different from the other LEDs, (ii) an LED with almost the same color as one of the LEDs (e.g., a LED with a slightly different wavelength or a different spectrum width), or (iii) an LED that has a color substantially identical to one of the colors already propagating within the device.

Herein, embodiments of the invention for altering light properties of an illumination device will, for exemplary purposes, describe (i) achieving white light illumination, (ii) planar illumination devices in which the white light is achieved by converting some of the blue light to yellow/green via a phosphor material, (iii) CCT tunability, and/or (iv) altering blue light intensity. However, it should be understood that other examples and other color combinations and tuning of other properties (e.g., CRI tuning) may be similarly performed and fall within the scope of embodiments of the present invention. Similarly, various embodiments are described as mixing blue with white light, and it should be understood that other combinations of different colors of light may be utilized in embodiments of the present invention.

Figure 1A:
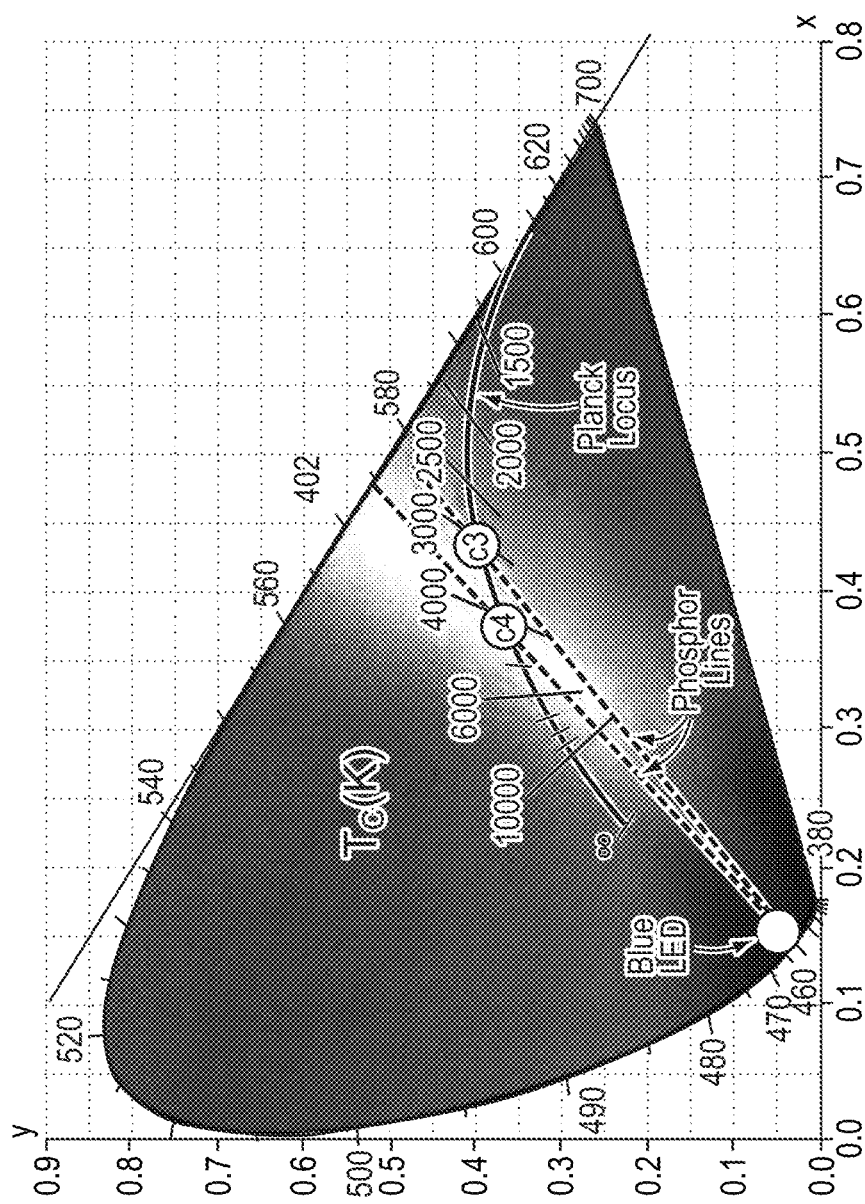
FIG. 1A depicts the adjustment of CCT emitted by an illumination system with reference to the Planck locus curve on the CIE 1931 chromaticity diagram in accordance with various embodiments of the invention.

In various embodiments, white light is produced as a combination of blue light and a phosphor layer that absorbs some of the blue light and re-emits a yellow/green light. In such embodiments, the resulting mixed, white light has a specific identifying value of its color, for example, on the Planck locus as determined by the CIE 1931 chromaticity diagram (or by another chromaticity diagram). FIG. 1A depicts, on the CIE 1931 chromaticity diagram, the Planck locus curve on which the resulting white light may have different CCT values. In FIG. 1A, the small circle at the bottom left represents the light emitted by the blue LED, and the "phosphor lines," which extend from that circle, represent the white color obtainable by mixing the blue light with some yellow/green light produced by the phosphor material. For a given phosphor line, light having the properties represented by any point of the line may be achieved by adjusting the phosphor thickness and/or concentration (for example, for phosphor materials such as quantum dots or other particles suspended in a polymeric binder, the "concentration" of the phosphor may be increased by increasing the amount of the phosphor material in a given volume of the binder). Thus, for example, point C3 shown on FIG. 1A, which represents a CCT of 3000K, may be obtained by adjusting the thickness and/or concentration of a particular phosphor utilized with the blue LED.

In various embodiments, a "phosphor" or a "phosphor material" may refer to one or more, or even two or more, different photoluminescent materials (e.g., phosphors, quantum dots, etc.), and each such combination may be characterized by a phosphor line on the chromaticity diagram. Phosphor materials configured to convert blue light to various different wavelengths of light are commercially available and may be selected by one of skill in the art without undue experimentation. The two exemplary phosphor lines shown in FIG. 1A are related to two different combinations of (or two different) phosphor materials. In embodiments of the invention, the CCT of light along the Planck locus may be tuned between various points. For example, tuning from point C3 (i.e., a CCT of 3000K) to point C4 (i.e., a CCT of 4000K) on FIG. 1A may be accomplished via (i) replacing the phosphor material (e.g., altering the type of phosphor material), and (ii) altering the phosphor thickness and/or concentration (or, equivalently, adding additional blue light (e.g., from one or more blue LEDs lacking phosphors). In the first step, the change in phosphor material enables the movement from one phosphor line to the other. For example, moving from the phosphor line intersecting point C3 to the phosphor line intersecting point C4 involves increasing the ratio of "yellow phosphor" (i.e., phosphor converting blue light to yellow light) to "red phosphor" (i.e., phosphor converting blue light to red light); such increases may be accomplished by replacing the first phosphor with the second phosphor. (Herein, "replacing" a phosphor material may refer to either a physical replacement in or on an illumination device or to the making of an alternative selection of a phosphor material deviating from an initial, starting phosphor material in a design process or methodology for an LED and/or an illumination device.) In the second step, the phosphor thickness and/or concentration is altered, and/or additional blue light is added, in order to move along the newly selected phosphor line. For example, moving from point C3 to point C4 on FIG. 1A requires less phosphor conversion (i.e., more blue light), so the amount (and/or concentration) of the phosphor may be reduced and/or blue light may be added.

Figure 1B:
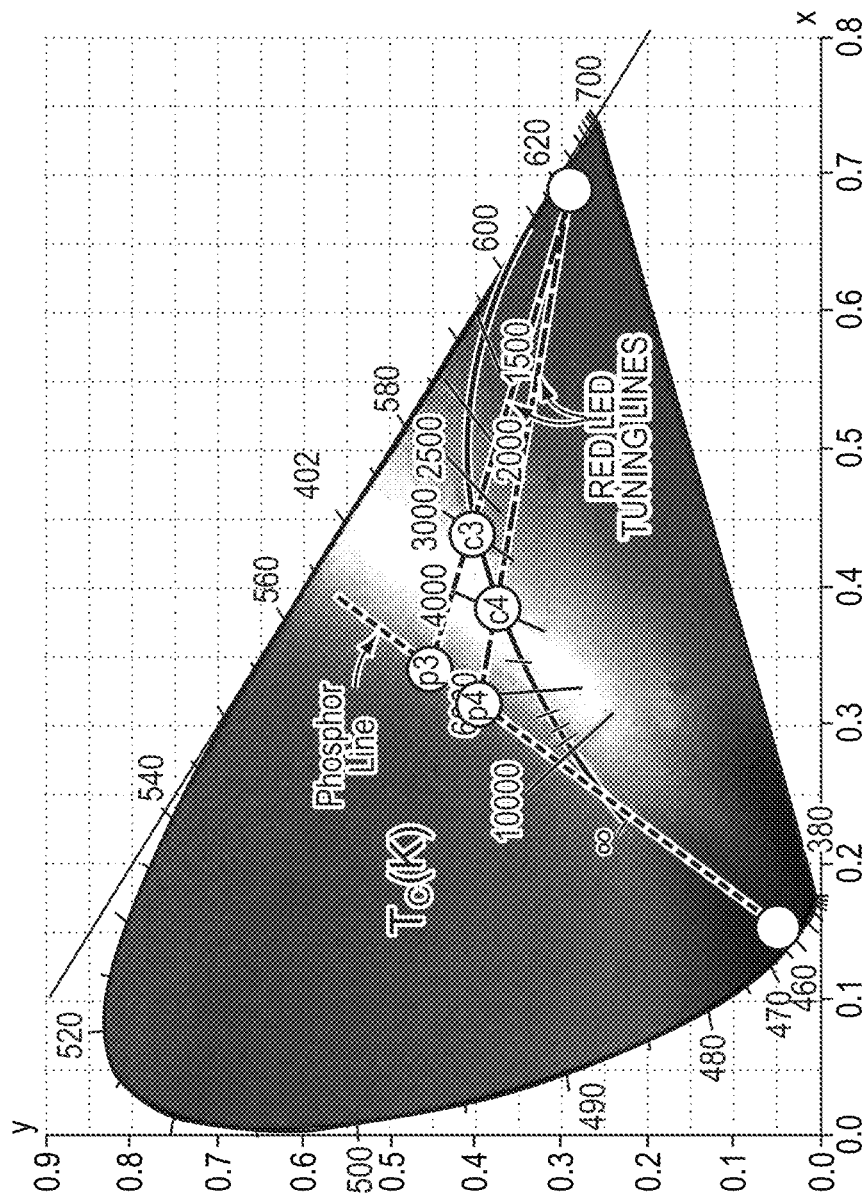
FIG. 1B depicts the adjustment of CCT emitted by an illumination system with reference to the Planck locus curve on the CIE 1931 chromaticity diagram in accordance with various embodiments of the invention.

In various embodiments of the invention, CCT tuning may be also achieved by utilizing a single phosphor material for the blue LED but with the addition of another LED emitting light of a different color, and by varying the light-output ratio of the different LEDs. FIG. 1B depicts an example of such an embodiment on the CIE 1931 chromaticity diagram, in which a red LED is utilized in conjunction with a blue LED with a yellow/green phosphor. (In various embodiments, the use of one or more red LEDs may be preferable to using phosphors converting light to red light, as the use of the LEDs may involve less light loss, less cost, and fewer reliability concerns.) FIG. 1B again depicts a phosphor line extending from the blue LED. Intersecting the phosphor line are two different "red LED tuning lines" representing light achievable via the addition of the red LED represented by the circle on the lower right-hand portion of the diagram. For example, in order to achieve light having a CCT of 3000K, i.e., point C3, the point P3 on the phosphor line may be selected via selection of the phosphor thickness and/or concentration, and then the ratio of blue light to red light within the system (via, e.g., adjusting the drive currents and resulting light intensities of the red and blue LEDs) may be adjusted to move along the red LED tuning line to point C3.

In the embodiment depicted in FIG. 1B, white light having different CCT values may also be selected. For example, adjusting the light output from point C3 (CCT of 3000K) to point C4 (CCT of 4000K) may be accomplished by (i) reducing the phosphor concentration and/or thickness (and/or adding unconverted blue light) to move from point P3 to point P4 along the phosphor line, and (ii) adjusting the ratio of blue light to red light within the system, increasing the relative amount of red light, to move from point P4 to point C4.

While the exemplary embodiment depicted in FIG. 1B utilizes a red LED as the second LED for light adjustment, embodiments of the invention may utilize LEDs emitting light of colors other than red in addition to, or instead of, one or more red LEDs. Those of skill in the art will realize that such LEDs would emit light represented by a different set of coordinates on the chromaticity diagram, and the ratio of such light to the blue light emitted by the blue LED may be adjusted to form "tuning lines" extending from that set of coordinates to the particular point on the blue-LED phosphor line.

Figure 2A:
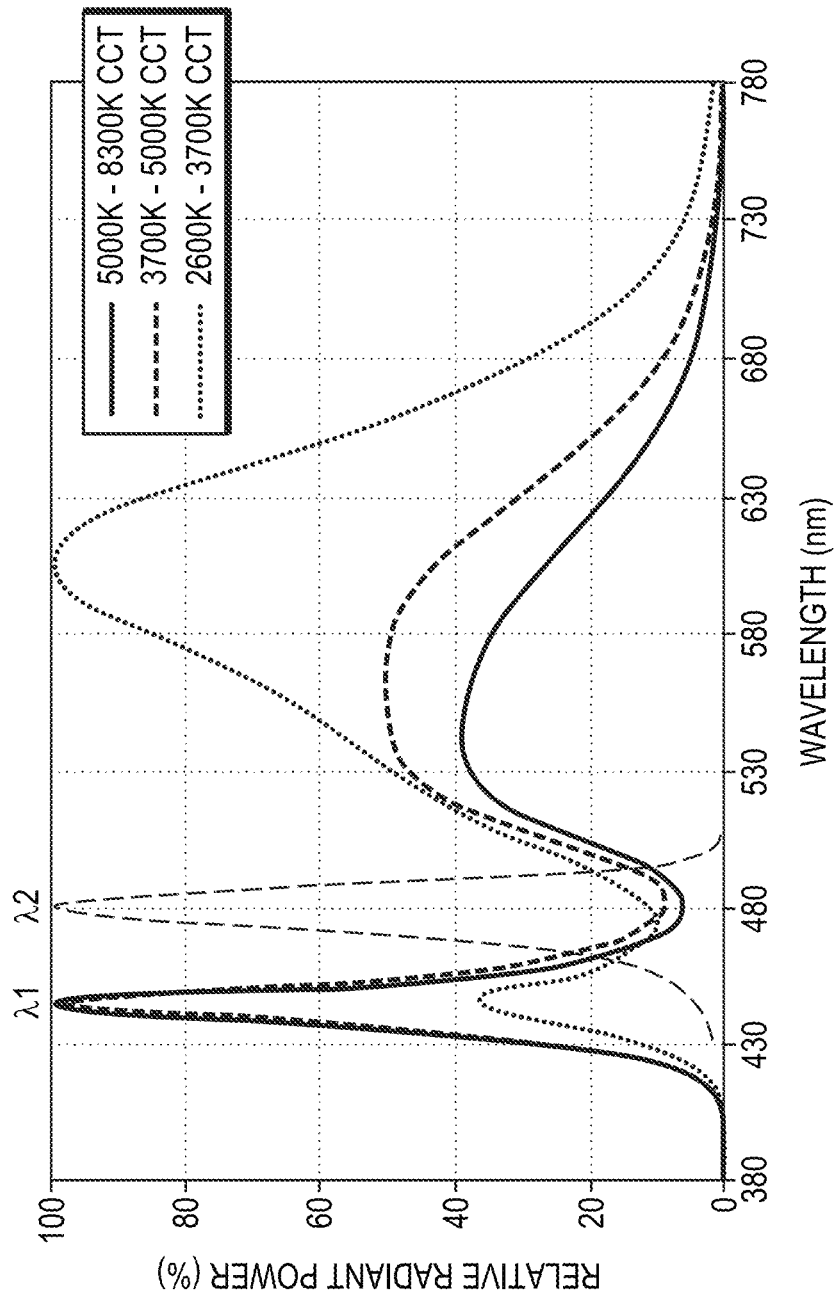
FIG. 2A is a graph of output spectra of various light-emitting diodes, with and without phosphor materials, in accordance with various embodiments of the invention.

Embodiments of the invention also include systems and techniques in which color properties (e.g., CCT) may be modified via addition of new light colors rather than modification of the phosphor structure within the device. FIG. 2A compares the output spectra of three different blue LEDs with different phosphor materials selected so that the output spectrum of white light has different ranges of color temperatures (these correspond to commercially available white LEDs from Cree's XLamp XM-L2 family of LEDs); all of these "first" blue LEDs have a peak blue-light wavelength of around 450 nm, labeled on FIG. 2A as $\lambda 1$. As shown, the different phosphor materials convert different amounts of the blue light into light having different wavelengths, resulting in different temperatures of white light. However, rather than altering the phosphor material of the LED to achieve a different CCT, in embodiments of the invention, the inclusion and adjustment of another LED (e.g., relative to the first blue LED) emitting light having a different peak wavelength may be utilized to alter the CCT of the device. For example, as depicted by the exemplary dashed line in FIG. 2A, a "second" blue LED may be included within the device, and the LED may be configured to emit light having a different peak wavelength, labeled on FIG. 2A as $\lambda 2$. In accordance with embodiments of the invention, the two different wavelengths $\lambda 1$ and $\lambda 2$ may correspond to the same color (e.g., different wavelengths of blue or another color light) or may correspond to different colors on the spectrum. In various embodiments, the difference between the two different wavelengths $\lambda 1$ and $\lambda 2$ may be at least 5 nm, at least 10 nm, at least 15 nm, at least 20 nm, at least 25 nm, or at least 30 nm. In various embodiments, the difference between the two different wavelengths $\lambda 1$ and $\lambda 2$ may be at most 80 nm, at most 70 nm, at most 60 nm, at most 50 nm, or at most 40 nm.

As shown in FIG. 2A, the $\lambda 2$ wavelength may be selected to be approximately equal to a local minimum in the spectrum of the phosphor-converted first LED. Thus, in various embodiments, light from the second LED propagating within the device and encountering the phosphor of the first LED will have little or substantially no effect on the output light from the first, phosphor-converted LED, as the phosphor will have little or no effect on light at the $\lambda 2$ wavelength. (In various embodiments, phosphor materials are configured to convert light, or more strongly convert light, emitted at a particular wavelength, for example $\lambda 1$ on FIG. 2A; that is, the color conversion efficiency of the phosphor material may be highest at wavelengths substantially equal to the peak wavelength emitted by the LED incorporating the phosphor and may be lower, and even approach zero, at other wavelengths.)

Figure 2B:
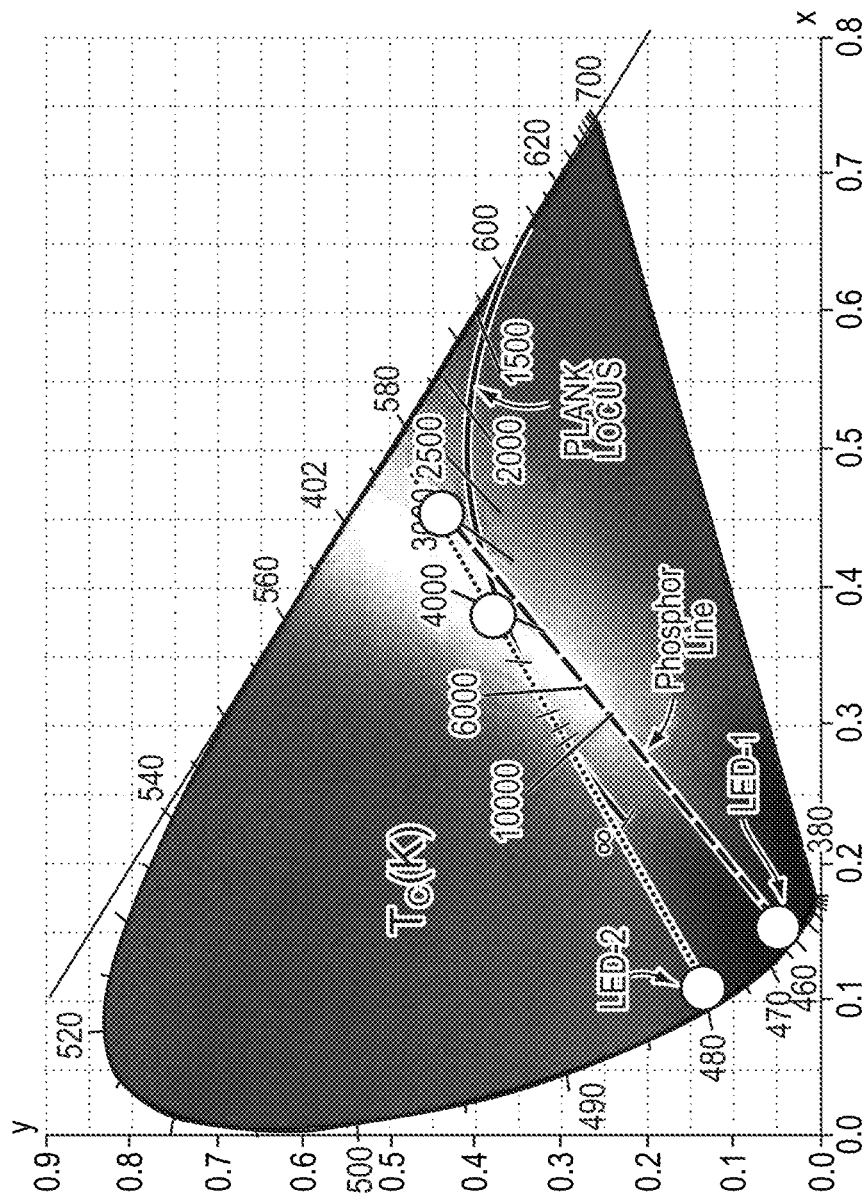
FIG. 2B depicts the adjustment of CCT emitted by an illumination system with reference to the Planck locus curve on the CIE 1931 chromaticity diagram in accordance with various embodiments of the invention.

FIG. 2B depicts an example of such an embodiment on the CIE 1931 chromaticity diagram, in which a second blue LED ("LED-2" on FIG. 2B) is utilized in conjunction with the first blue LED ("LED-1" on FIG. 2B) with a yellow/green phosphor. The phosphor line extending from LED-1 represents the various different lights that may be produced by the phosphor and LED-1 as the phosphor thickness and/or concentration are varied. In an example embodiment, the phosphor thickness and/or concentration are fixed, resulting in mixed light (in this exemplary case yellow-white light) from LED-1 represented by the empty circle on FIG. 2B along the phosphor line. The dotted line on FIG. 2B extending from the empty circle to LED-2 represents the mixed light that may be achieved via altering the relative intensity of LED-1 and LED-2. For example, the filled circle represents white light having a CCT of 4000K achievable with the relative addition of light from LED-2 emitted from the device. As shown, this adjusted mixed light may correspond to white light lying on the Plank locus curve. In additional embodiments, one or more other LEDs configured to emit light at different wavelengths may be incorporated within the device, and their relative intensities varied, in order to provide additional control over properties of the emitted light such as CCT and CRI. For example, while the exemplary embodiment of FIG. 2B utilizes two different blue LEDs (one phosphor-converted and one not), various embodiments may also include at least one LED emitting at a different color, e.g., red, as in the example of FIG. 1B.

Figure 3A:
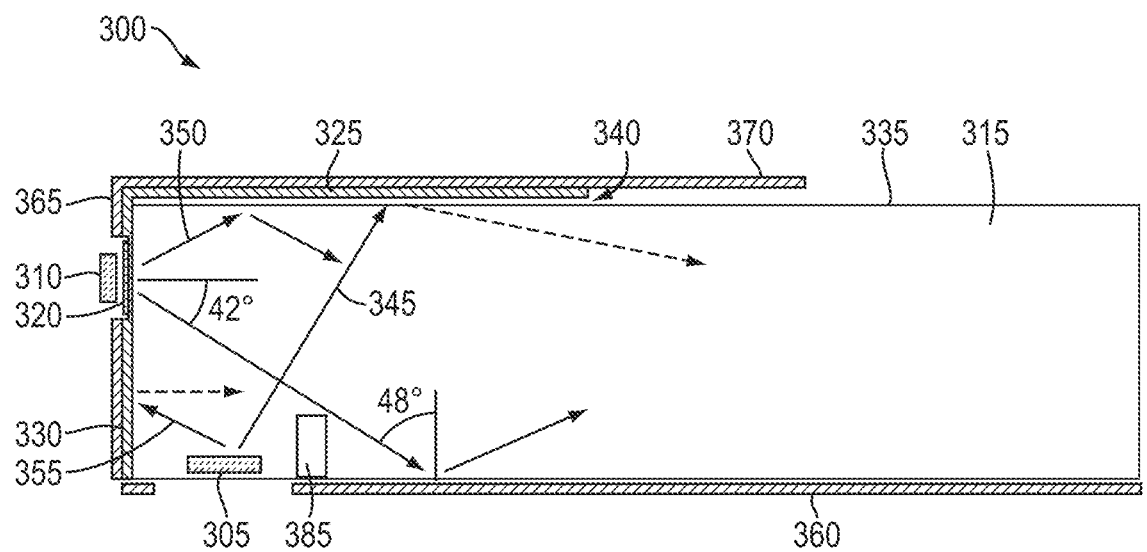
FIGS. 3A and 3B are a schematic cross-sectional side view (FIG. 3A) and top view (FIG. 3B) of an illumination system in accordance with various embodiments of the invention.
Figure 3B:
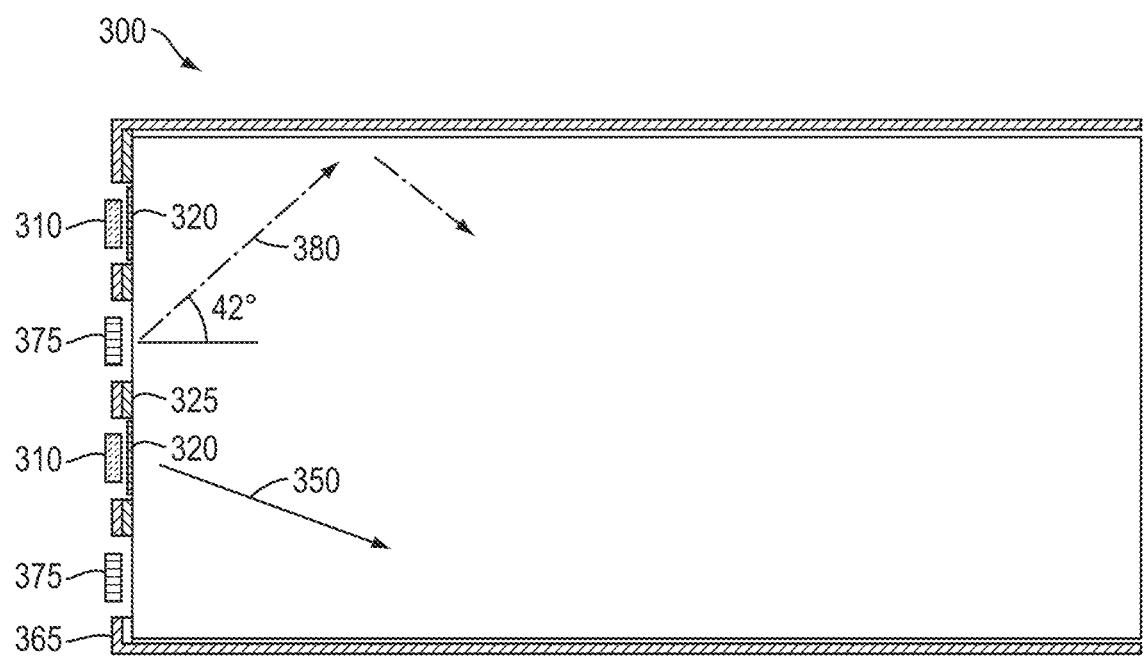

Illumination device in accordance with embodiments of the invention may be configured to utilize light from two or more LEDs emitting lights at different wavelengths, as well as one or more phosphor materials, while maximizing light output of mixed light having a desired CCT (or other property). Such devices may also advantageously utilize LEDs emitting light of the same color but at different peak wavelengths, for example as shown in the emission spectra of FIG. 2A. FIGS. 3A and 3B are, respectively, a cross-sectional side view and a cross-sectional top view of an illumination device 300 in accordance with embodiments of the present invention. As shown, device 300 may include herein a first LED 305 configured to emit light of a first wavelength and a second LED 310 configured to emit light of a second wavelength different from the first wavelength, as well as a waveguide 315. As shown for LED 305, one or more of the LEDs may be embedded within the waveguide 315, while, as shown for LED 310, one or more of the LEDs may be butt-coupled to the waveguide 315. As utilized herein, an LED butt-coupled to a waveguide is not in optical contact with the waveguide, e.g., a small air gap may be present between the LED and the waveguide; hence, all light from the LED that is coupled into the waveguide propagates and is confined within the waveguide by total internal reflection (TIR), as light emitted at sufficiently large angles to not be so confined is not coupled into the waveguide to begin with. As utilized herein, an LED embedded within a waveguide is in optical contact with the waveguide; hence more light emitted by the LED is coupled into the waveguide (than, in general, for a butt-coupled LED) due to the smaller index-of-refraction difference between the LED and the waveguide material compared to the LED and air.

In various embodiments, LED 305 and LED 310 may emit light of different wavelengths but having the same color, e.g., blue. An example of such an LED combination is depicted on FIG. 2B as LED-1 and LED-2. The difference in peak wavelength of the light from LEDs 305, 310 may be advantageously utilized, in embodiments of the invention, to reduce the amount of light emitted by one of the LEDs into the other LED and absorbed or otherwise lost, resulting in loss of efficiency of the illumination device. For example, as shown in FIG. 3A, an optical band-pass filter 320 may be disposed between the LED 310 and the waveguide 315, and the band-pass filter 320 may be configured to transmit only light having the LED 310 peak wavelength while reflecting other wavelengths of light. Thus, the band-pass filter 310 will transmit light from LED 310 into the waveguide 315 while reflecting any light from LED 305 back into the waveguide 315, thereby preventing its absorption at or by LED 310. Optical band-pass filters (e.g., in the form of a film or one or more layers) configured to pass specific wavelengths of light, or ranges of wavelengths, are conventional and may be selected, designed, and/or fabricated by those of skill in the art without undue experimentation (see also filter 880 described below).

In addition, as shown in FIG. 3A, the locations of the LEDs 305, 310 may be selected such that no (or significantly no) light emitted by LED 310 is emitted directly into LED 305 (i.e., emitted into LED 305 without first reflecting from a surface of or another feature within the waveguide). Since, in the exemplary embodiment of FIG. 3A, LED 310 is butt-coupled to waveguide 315, only light emitted from LED 310 toward the waveguide 315 at sufficiently low angles of incidence is actually coupled into the waveguide, while light emitted at larger angles is not coupled into the waveguide. For example, FIG. 3A depicts an example in which only light emitted at an angle of 42° or smaller (relative to the normal to the waveguide surface, corresponding to an index of refraction for the waveguide of 1.5) is coupled into the waveguide. (The angles depicted in FIGS. 3A and 3B are merely exemplary, and other angles will apply to different illumination systems, as understood by those skilled in the art.) Thus, LED 305 may be disposed sufficiently close to the side surface of the waveguide 315, at which LED 310 is butt-coupled, such that the in-coupled light from LED 310 cannot be directly emitted into the LED 305, i.e., the LED 305 is "shadowed" from the light from LED 310 within the waveguide. Such prevention of light being emitted directly into another LED enables the illumination device 300 to have a high output efficiency and lower light loss.

As shown in FIG. 3A, the illumination device 300 may also include a phosphor material 325 along one or more surfaces of the waveguide 315. In the embodiment of FIG. 3A, the phosphor material 325 is in optical contact with (e.g., adhered to with an optical adhesive) a side facet 330 of the waveguide 315 but not in optical contact with a top facet 335 of the waveguide 315; for example, an air gap 340 may be disposed between the phosphor material 325 and the top facet 335, and/or the phosphor material 325 may be in mechanical contact but not optical contact with top facet 335. Thus, the phosphor material 325 is able to convert light 345 emitted by LED 305 not in the TIR condition into light of a different wavelength (e.g., blue to yellow/green, or other colors) while not converting light 350 emitted by LED 310, which propagates within the waveguide 315 in the TIR condition. In addition, light 355 emitted by LED 305 toward side facet 330 is converted by the phosphor material 325; since LED 310 is butt-coupled to side facet 330, substantially no light emitted by LED 310 is converted by the phosphor material 325. In this manner, illumination devices in accordance with embodiments of the invention may feature one or more LEDs configured and placed such that their light is at least partially converted into light of a different wavelength by a phosphor material (e.g., LED 305), as well as one or more other LEDs configured and placed such that their light is not converted by the phosphor material (e.g., LED 310). Controlling the relative emission intensities of the different LEDs enables the selection and adjustment of various properties of the mixed light emitted by the illumination device, as detailed herein.

As also shown in FIG. 3A, the illumination device 300 may include a bottom reflector 360 (e.g., a metal sheet or coating) to facilitate confinement of light within the waveguide 315. The illumination device 300 may also include, in various embodiments, a side reflector 365 and/or a top reflector 370 for confinement of light. In various embodiments, reflector 365 and/or reflector 370 may be replaced by or augmented with an absorber to absorb light escaping from the waveguide and/or the phosphor material.

Illumination devices in accordance with embodiments of the invention may also include one or more additional LEDs configured to emit light of a color different from that emitted by LEDs 305, 310. For example, FIG. 3B depicts two different LEDs 375 butt-coupled to the side facet 330 of the waveguide 315 in-line with two LEDs 310. In an exemplary embodiments, the LEDs 375 are configured to emit red light; as mentioned above, LEDs 305, 310 may emit blue light in various embodiments. In other embodiments, one or more LEDs 375 may alternatively or in addition be embedded within the waveguide, e.g., at the bottom facet of the waveguide as for LED 305. In various embodiments, another band-pass filter may be disposed between each LED 375 and the waveguide to enable transmission of light from LEDs 375 into the waveguide while reflecting light from other LEDs (e.g., LED 305 or LED 310) from entering LEDs 375 and being absorbed or otherwise lost. As shown, light 380 emitted by LED 375 may propagate within the waveguide 315 in the TIR condition due to the butt-coupling of LED 375 to the waveguide. In addition, light 380 is typically not wavelength-converted by phosphor material 325, which may be selected to have a conversion efficiency maximized (or at least larger) at the wavelength of light emitted by LED 305.

Finally, embodiments of the invention maximize the amount of light emitted by LED 305 that is wavelength-converted by the phosphor material 325 via the inclusion of a solid reflector 385 within the waveguide 315 proximate the LED 305. The reflector 385, which may include, consist essentially of, or consist of a metal or other reflective material, prevents light from LED 305 from propagating directly into the waveguide 315 away from the phosphor material 325. Rather, the light emitted by LED 305 away from the phosphor material 325 is reflected back toward the side and top facets 330, 335 to increase the amount of light wavelength-converted by the phosphor material. Thus, most of the light emitted by LED 305 is converted to a different wavelength, while (as detailed above) most of the light emitted by LED 310 remains unconverted, even when the peak wavelengths of LEDs 305, 310 are near each other and/or within the same color regime of the spectrum. In this manner, control of the relative emission intensities of LEDs 305, 310 enables the selection and adjustment of light properties such as CCT, as depicted in FIG. 2B.

In various embodiments, the mixed light from the various LEDs and phosphor material propagating within the waveguide 315 is emitted from an out-coupling region. For example, the mixed light may be emitted from top facet 335 in the area to the far right of FIG. 3A or another region not shown in FIG. 3A. The light may be out-coupled from the waveguide via inclusion of out-coupling elements such as scattering centers (e.g., particles, roughness, one or more patterns) included in and/or on the waveguide (not shown).

Figure 4A:
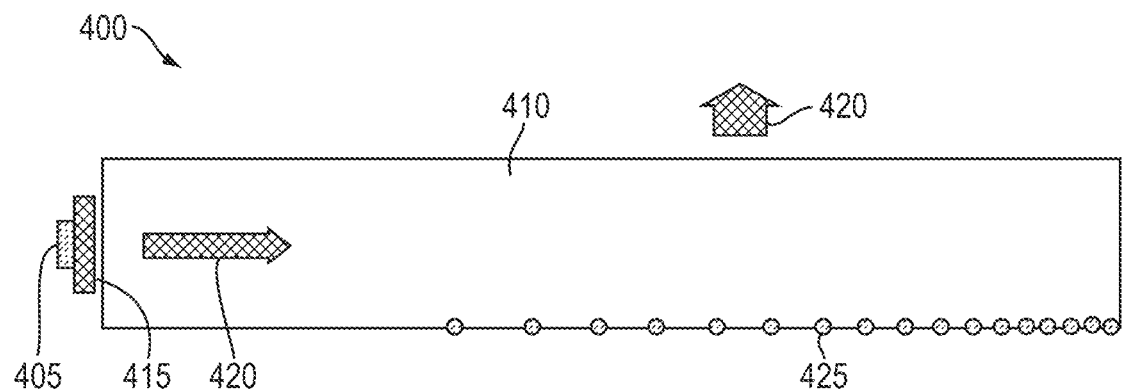
FIG. 4A is a schematic cross-sectional view of an illumination system in accordance with various embodiments of the invention.

As depicted in FIG. 3A, in various embodiments of the invention, illumination devices may feature LEDs butt-coupled to a waveguide. For example, FIG. 4A schematically depicts an illumination device 400 in which an LED 405 is butt-coupled to a waveguide 410. For example, as shown in FIG. 4A, the LED 405 may be a blue LED that incorporates or is otherwise coupled to a phosphor material 415 that, as detailed above, results in mixed light 420 being coupled into the waveguide and eventually out-coupled from the waveguide after interacting with out-coupling elements 425 disposed at or on the surface of the waveguide 410. As shown, the size, concentration, or density of the out-coupling elements 425 may change (e.g., increase) as a function of distance away from the LED 405 in order to improve the areal uniformity of the out-coupled light.

Figure 4B:
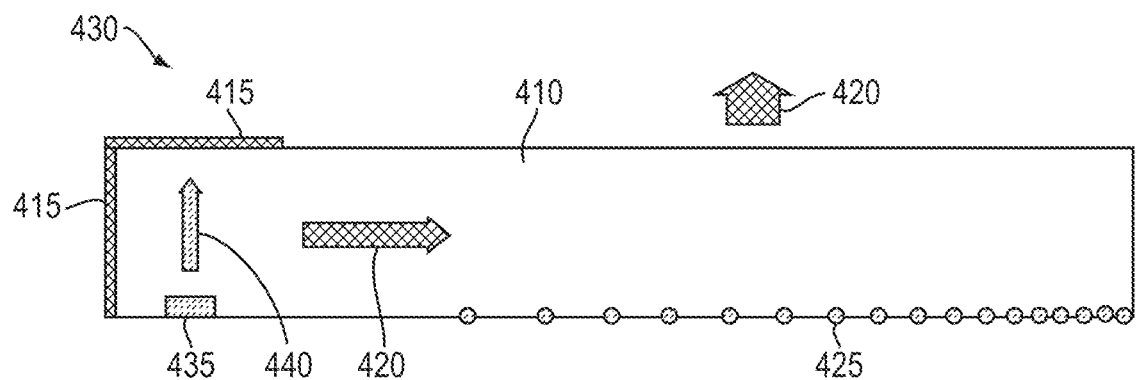
FIG. 4B is a schematic cross-sectional view of an illumination system in accordance with various embodiments of the invention.

As shown in FIG. 4B, an illumination device 430 in accordance with embodiments of the present invention may alternatively (or in addition, as shown in FIG. 3A) feature an LED 435 embedded within the waveguide 410. For example, in the example shown in FIG. 4B, the LED 435 may be a blue LED, the blue light 440 from which may interact with phosphor material 415 spaced-apart from the LED 435 (e.g., in a "remote-phosphor" configuration). Such configurations may enable lower temperature operation of the phosphor material 415 and therefore result in higher power and increased reliability, as well as less light absorption by the LED itself, as less light is back-reflected to the LED. As shown in FIGS. 3A and 3B, reflector and/or absorber layers may also be added to redirect light to emit through a particular out-coupling region (e.g., only one facet of the waveguide or a portion thereof), and/or for improving efficiency and/or reducing light leakage.

Figure 5A:
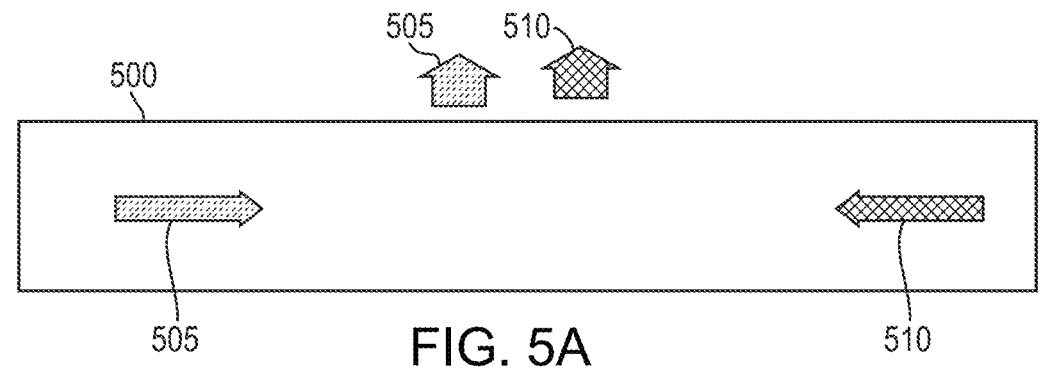
FIG. 5A is a schematic cross-sectional view of an illumination system in accordance with various embodiments of the invention.
Figure 5B:
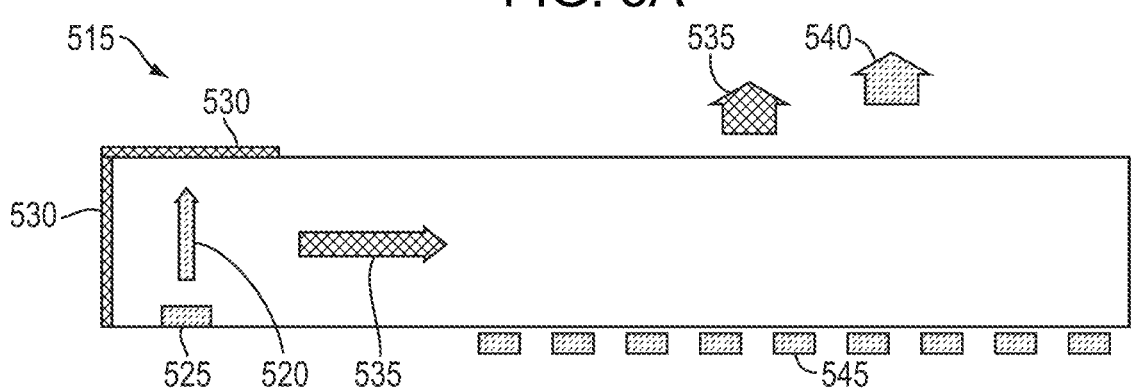
FIG. 5B is a schematic cross-sectional view of an illumination system in accordance with various embodiments of the invention.

In both of the configurations shown in FIGS. 4A and 4B, one or more LEDs of other colors may also be added for additional control over the properties of the emitted light (e.g., the CCT). FIGS. 5A-5D depict exemplary embodiments in which additional blue light is added. As detailed above, for example, such blue light may be emitted by a different blue LED having a different peak wavelength. In various exemplary embodiments, this additional blue light may be mixed within the waveguide with the white light produced by the interaction of the primary blue LED with a phosphor material, which may either be coupled to the LED or disposed in a remote-phosphor configuration. The blue and white light may be mixed in multiple different ways. For example, FIG. 5A depicts a waveguide 500 (e.g., a portion of an illumination device) in which blue light 505 and white light 510 are introduced into the waveguide from opposite facets of the waveguide, are mixed together, and emitted from the waveguide 500. FIG. 5B depicts an illumination device 515 in which blue light 520 from an embedded blue LED 525 interacts with phosphor material 530 to produce white light 535, which mixes with blue light 540 emitted by one or more secondary blue LEDs 545 (which may be butt-coupled to the waveguide, as shown, or embedded within the waveguide). As shown in FIG. 5B, the one or more secondary blue LEDs 545 may be disposed at or near the out-coupling region of the waveguide. In various embodiments, most or substantially all of the light from the blue LEDs 545 does not interact with the phosphor material 530 and is instead mixed as blue light with the white light 535. For example, the phosphor material 530 may be configured to interact with the blue light from LED 525 but not from LED(s) 545, as discussed above.

Figure 5C:
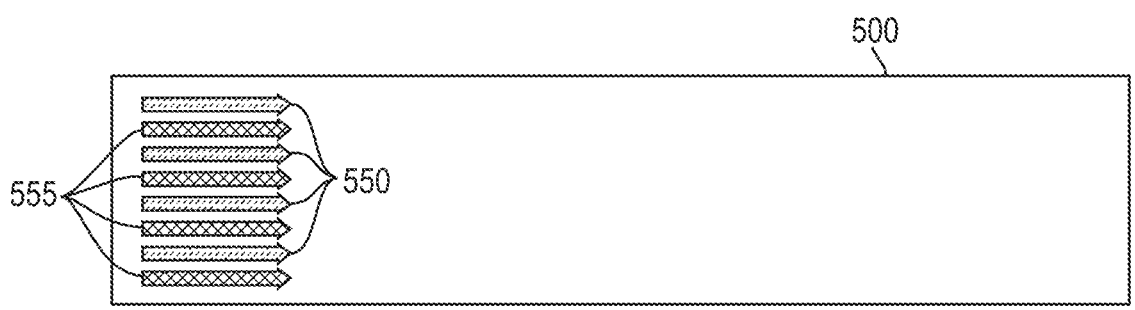
FIG. 5C is a schematic top view of an illumination system in accordance with various embodiments of the invention.
Figure 5D:
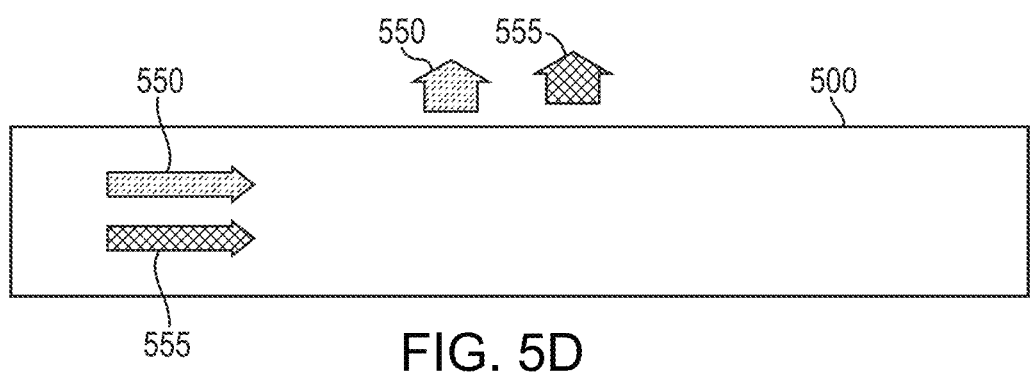
FIG. 5D is a schematic cross-sectional view of an illumination system in accordance with various embodiments of the invention.

FIG. 5C schematically depicts the top view of an embodiment in which the sources of blue light 550 and white light 555 are spatially separated within the waveguide 500, and FIGS. 5C and 5D both depict embodiments in which the blue light 550 and white light 555 are coupled into the waveguide 500 from the same side or facet of the waveguide, and then subsequently emitted from the waveguide. In the configurations of FIGS. 5A, 5C, and 5D, the LED sources of the light may be embedded in or butt-coupled to the waveguide. In addition, the source of the white light may be a blue LED interacting with a phosphor material or a group of different colored LEDs (e.g., RGB) whose light mixes together to form white light.

Figure 6A:
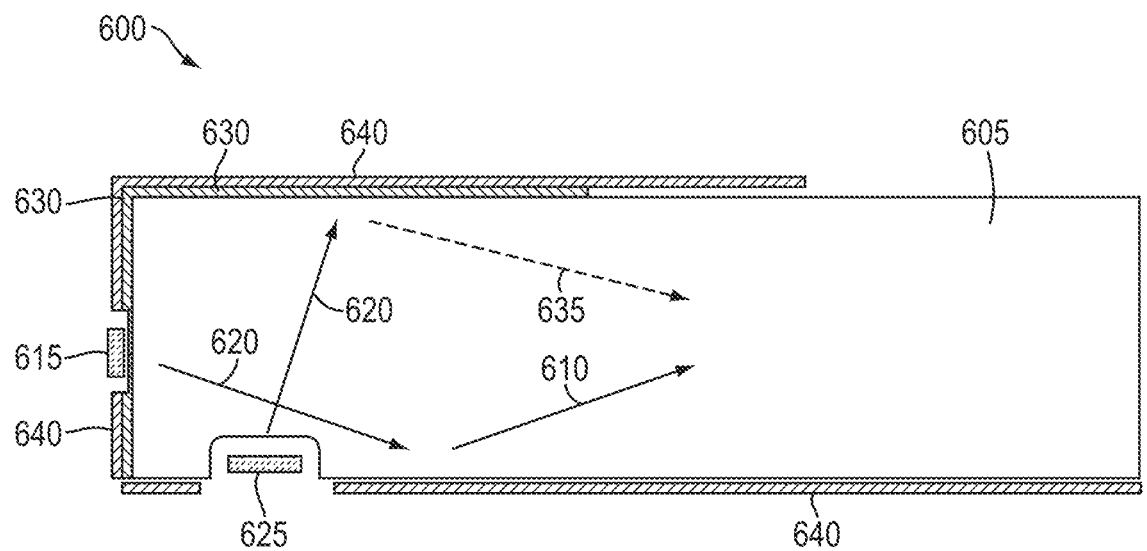
FIG. 6A is a schematic cross-sectional view of an illumination system in accordance with various embodiments of the invention.

LEDs may have their light coupled into one side of the waveguide while the LEDs are separated from each other. For example, as shown in FIG. 6A (and FIG. 3A, for example), an illumination device 600 may feature a waveguide 605, and the light 610 from an LED 615 may be coupled into a side facet of the waveguide 605, while the light 620 from a different LED 625 may be coupled into the bottom facet of the waveguide near that same side facet. In exemplary embodiments, both LEDs 615, 625 may be LEDs emitting the same color (e.g., blue), and/or the LEDs 615, 625 may emit light of different peak wavelengths. As shown in FIG. 6A, LED 615 may be positioned (and, as described above regarding FIG. 3A, butt-coupled to the waveguide) so that most or substantially all of the light 610 is emitted toward the out-coupling region and/or away from phosphor material 630 so as not to interact with phosphor material 630. In contrast, LED 625 may be positioned to emit most or substantially all of the light 620 toward the phosphor material 630, which interacts with the light to form mixed light 635. Thus, the light out-coupled from the waveguide 605 may include a mixture of light 610 and mixed light 635. In various embodiments, reflectors 640 may cover all or a portion of one or more facets of the waveguide 605 to prevent light leakage therefrom.

Figure 6B:
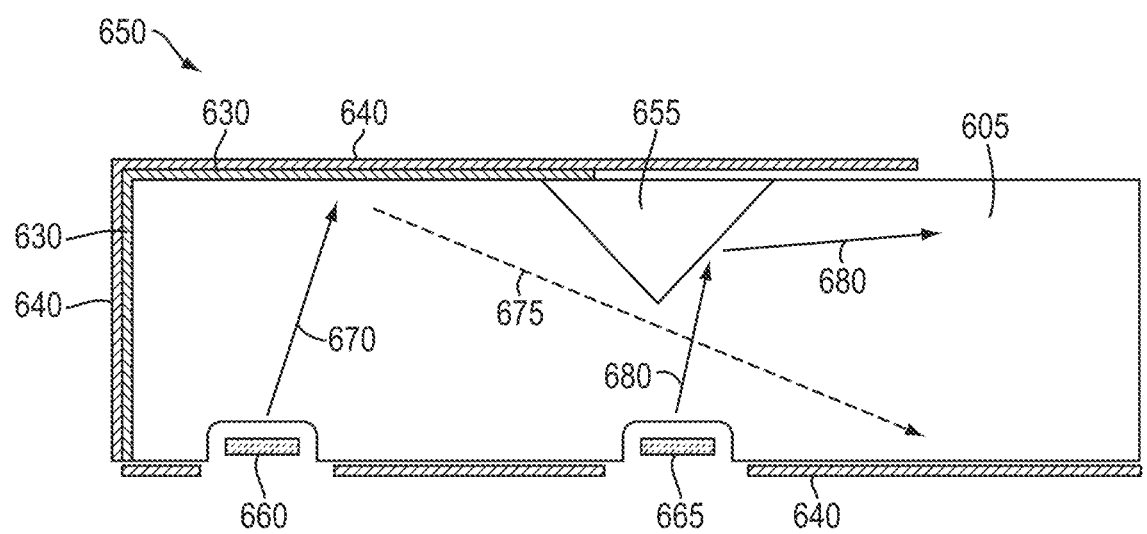
FIG. 6B is a schematic cross-sectional view of an illumination system in accordance with various embodiments of the invention.

FIG. 6B depicts an alternative embodiment of the invention, in which an illumination device 650 includes a depression 655 (e.g., a prism disposed within the waveguide) utilized to separate light in-coupled into waveguide 605 from LEDs 660, 665. As shown, LED 660 is positioned such that light 670 emitted therefrom is emitted toward and interacts with the phosphor material 630 to form mixed light 675. However, LED 665 is positioned beneath (or even on the opposite side of) depression 655, which reflects light 680 emitted by LED 665 away from the phosphor material 630 and toward the out-coupling region. Thus, the light out-coupled from the waveguide 605 will include, consist essentially of, or consist of mixed light 675 and unconverted light 680.

Figure 7A:
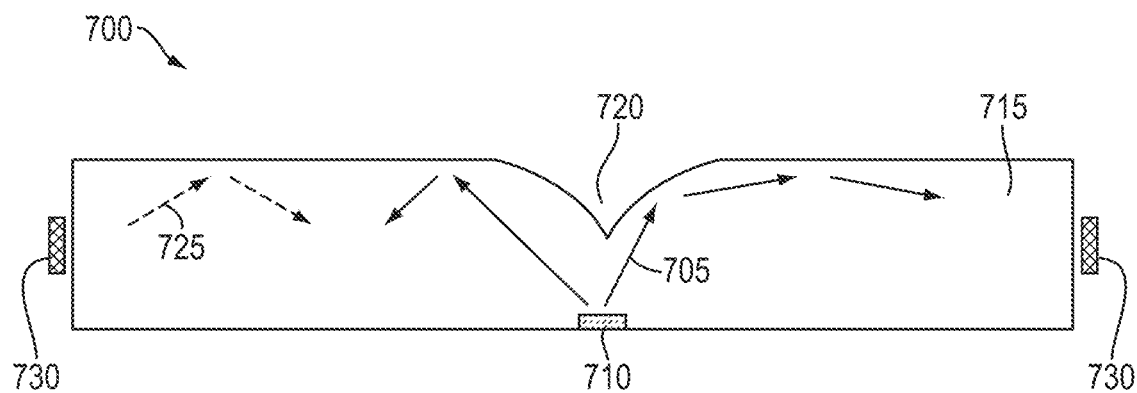
FIGS. 7A and 7B are a schematic cross-sectional side view (FIG. 7A) and top view (FIG. 7B) of an illumination system in accordance with various embodiments of the invention.
Figure 7B:
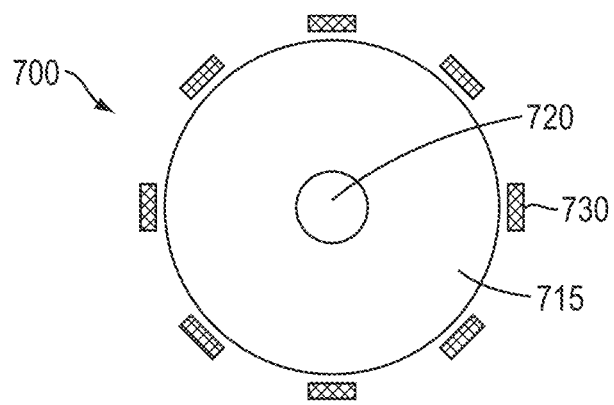

FIG. 7A is a side view of an illumination device 700 in which light 705 (e.g., blue light) from an LED 710 (e.g., a blue LED) is emitted into the bottom facet of a waveguide 715 and coupled into the waveguide via a depression/facet 720, which distributes the light 705 into the waveguide for eventual emission therefrom. Device 700 also features light 725 (e.g., white light) from LEDs 730 (e.g., white LEDs) coupled into the side facets of the waveguide 715 for mixture with the light 705 from LED 710. As shown, the LEDs 730 may be butt-coupled to the waveguide while the LED 710 may be embedded within the waveguide. As shown in the top view of FIG. 7B, the device 700 may be circular, and the LEDs 730 may emit light into the circumference of the waveguide 715 while the LED 705 (not visible in FIG. 7B) emits light into the waveguide 715 from its bottom surface.

In the example embodiment of FIG. 7A, the depression/prism 720 has a curved shape, and the LED 710 is embedded within the waveguide, and thus most of the light 705 is confined in the waveguide 715 via TIR. As also shown, the LEDs 730 are butt-coupled to the waveguide 715, e.g., there is an air gap between the LEDs and the waveguide; therefore, all the light 725 that is coupled into the waveguide 715 remains confined in the waveguide 715 via TIR until emission from the out-coupling region (not shown).

In various embodiments of the present invention, illumination devices are configured to improve the areal uniformity of out-coupled light intensity and/or color properties (e.g., CCT), even when light of different colors is coupled into the waveguide from different locations and/or in different directions. As shown in FIGS. 4A and 4B, when light is coupled into the waveguide from the same side of the waveguide, out-coupling elements such as scattering centers may be configured such that the resulting light output is substantially uniform. For example, the density, size, and/or concentration of the elements may vary as a function of distance away from the light source, increasing the amount of out-coupled light as the flux within the waveguide decreases.

Figure 8A:
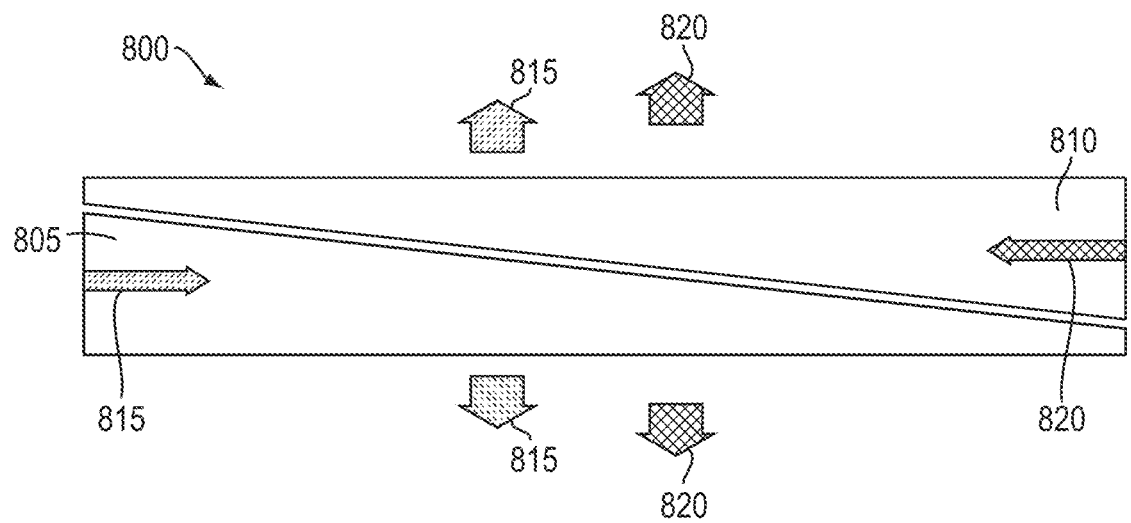
FIG. 8A is a schematic cross-sectional view of an illumination system in accordance with various embodiments of the invention.

FIG. 8A depicts portions of an illumination device 800 in which light of different colors is in-coupled into the device from different directions. As shown, in order to improve uniformity of the out-coupled light, two wedge-shaped waveguides 805, 810 are utilized. As shown, light 815 (e.g., blue light) is in-coupled into waveguide 805 at the larger side of the wedge-shaped waveguide 805 and propagates toward the smaller edge of waveguide 805. As the size (i.e., thickness) of the waveguide 805 decreases, light 815 increasingly loses its TIR condition and is therefore increasingly out-coupled from the waveguide. Similarly, light 820 (e.g., white light) is in-coupled into waveguide 810 at the larger side of the wedge-shaped waveguide 810 and propagates toward the smaller edge of waveguide 810. As the size (i.e., thickness) of the waveguide 810 decreases, light 820 increasingly loses its TIR condition and is therefore increasingly out-coupled from the waveguide. The collective effect is substantially uniform output of light 815, 820 from device 800. In various embodiments, a reflector may be disposed over the top or bottom surface of device 800 so that light is preferentially emitted only from one side of the device 800. In various embodiments featuring dual waveguides (see also, for example, FIGS. 8E and 8F), the waveguides 805, 810 are not in optical contact, e.g., there is a small air gap between the waveguides, as shown in FIG. 8A. In other embodiments, the waveguides 805, 810 are in optical contact, e.g., coupled together by an optical adhesive or other transparent filler material.

Figure 8B:
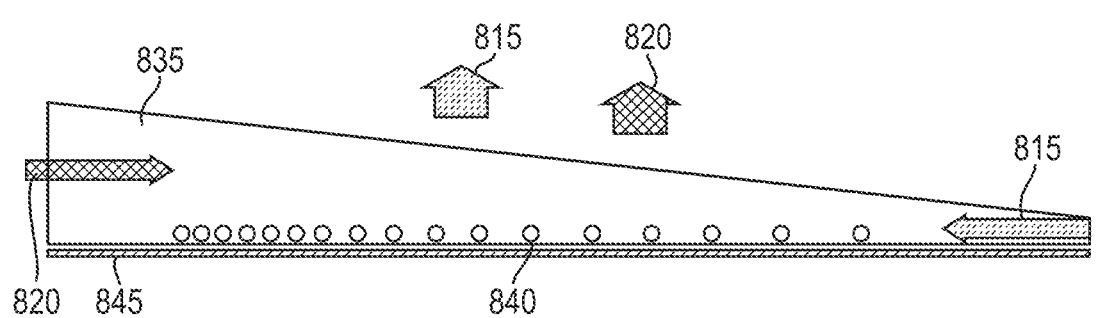
FIG. 8B is a schematic cross-sectional view of an illumination system in accordance with various embodiments of the invention.

Embodiments of the invention also include illumination devices configured for improved areal uniformity of out-coupled light of multiple different colors or peak wavelengths, even using only a single waveguide. FIG. 8B depicts portions of an illumination device 830 in which light 815 and light 820 are in-coupled into a single wedge-shaped waveguide 835 from opposite sides. As detailed above for illumination device 800, the light 820 propagates toward the smaller edge of the wedge-shaped waveguide 835 and is out-coupled from the waveguide at increasing luminous density as a function of distance from the larger edge of the waveguide due to increasing loss of TIR condition and confinement. Since light 815 is propagating through the waveguide in the opposite direction, it is not out-coupled via the same mechanism. Rather, the size (e.g., thickness) of the waveguide increases in the propagation direction of light 815, and the divergence of the light 815 may decrease and the light 815 may become increasingly confined within waveguide 835. In this embodiment, the device 830 features out-coupling elements 840 that are wavelength-dependent and therefore preferentially out-couple light 815 while leaving light 820 substantially unaffected. In various embodiments, the wavelength-dependent out-coupling elements 840 have a dimension (e.g., diameter, width, etc.) substantially equal to the wavelength of light 815 and therefore preferentially out-couple light 815 due to, for example, interference and/or Mie scattering. Interference and Mie scattering are quite wavelength-dependent; thus, the out-coupling elements 840 will have much less, or even substantially no, effect on light 820 in embodiments in which the difference in wavelength between light 820 and light 815 exceeds a threshold amount, e.g., approximately 30 nm, approximately 40 nm, or approximately 50 nm. In various embodiments, the wedge angle of the waveguide 835 (i.e., the angle between the bottom surface and the angled top surface) may be tuned to account for any light 820 out-coupled by the out-coupling elements 840. In various embodiments, the out-coupling elements 840 may be utilized in conjunction with another set of out-coupling elements that preferentially out-coupled light 820 and leave light 815 substantially unaffected. Thus, in various embodiments, the out-coupling of each of the lights 815, 820 may be separately controlled, thereby enabling control of the color, spectrum, and/or other properties (e.g., CCT) of the light emitted from the waveguide.

As shown, the size, density, and/or concentration of the wavelength-dependent out-coupling elements 840 may increase as a function of distance away from the source of light 815, thereby improving the uniformity of the out-coupled light 815. Thus, illumination device 830 collectively emits substantially uniform intensities of both light 815 and light 820. As also shown, a reflector 845 may be provided to prevent light leakage from the bottom surface (and/or any other desired surface) of the waveguide 835. While the waveguides of FIGS. 8A and 8B are depicted as regular trapezoids (nearly triangular) having straight surfaces, in various embodiments, one or more surfaces of the waveguide may be curved to further influence the out-coupling uniformity. For example, in various embodiments the top surface of waveguide 835 from which light is out-coupled may be curved (concavely or convexly).

Figure 8C:
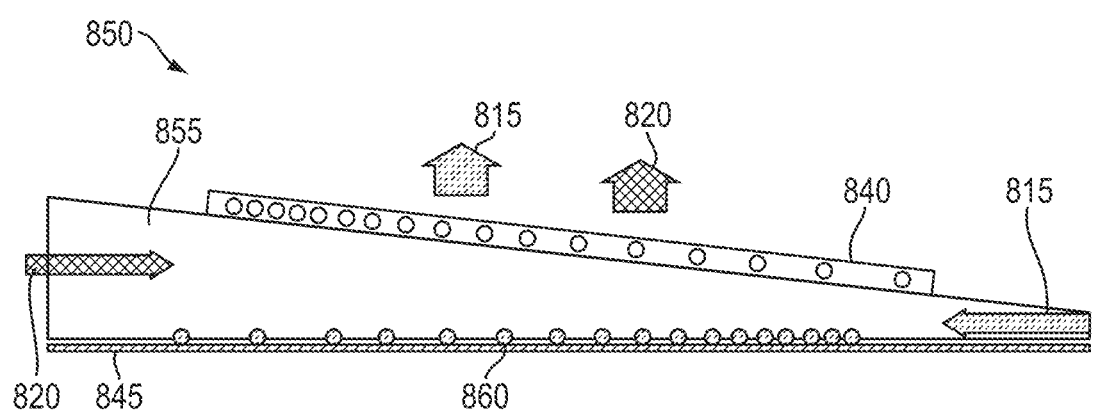
FIG. 8C is a schematic cross-sectional view of an illumination system in accordance with various embodiments of the invention.

Various embodiments of the present invention may improve uniformity utilizing both shaped waveguides and out-coupling elements. FIG. 8C depicts portions of an illumination device 850 in which light 815 and light 820 are in-coupled into a single wedge-shaped waveguide 855 from opposite sides. The light 820 is out-coupled uniformly from the device not only due to the loss of TIR as the light 820 propagates toward the smaller end of the wedge-shaped waveguide, but also due to the influence of out-coupling elements 860, which out-couple light substantially irrespective of the wavelength of the light. The out-coupling elements 860 may have a feature size (e.g., diameter, width, length, etc.) that greatly exceeds the wavelength(s) of light out-coupled from the waveguide, e.g., at least five times greater, at least ten times greater, or even at least 20 times greater. In various embodiments, the out-coupling elements 860 may take the form of a pattern of structures like hemispherical bumps or recesses and/or prismatic lines.

The light 815, in-coupled from the opposite direction, is uniformly out-coupled due to interaction with wavelength-dependent out-coupling elements 840 disposed on the top surface of the waveguide 855. As shown, in various embodiments, the out-coupling elements 840 may be disposed on or in a thin film that may be optically adhered to the surface of the waveguide 855. Since the out-coupling elements 840 may include, consist essentially of, or consist of, for example, a grating or a multi-layer thin film, and may therefore be more delicate mechanically, disposing the out-coupling elements 840 within a thin film may serve to protect the more fragile out-coupling elements and enable fabrication thereof separate from that of the waveguide and/or other elements of device 850. In various embodiments, device 850 may utilize waveguides 855 having shapes other than wedges due to the improved uniformity provided by the out-coupling elements 840, 860. For example, device 850 may utilize a rectangular waveguide (see FIGS. 4A and 4B) having parallel top and bottom surfaces.

Figure 8D:
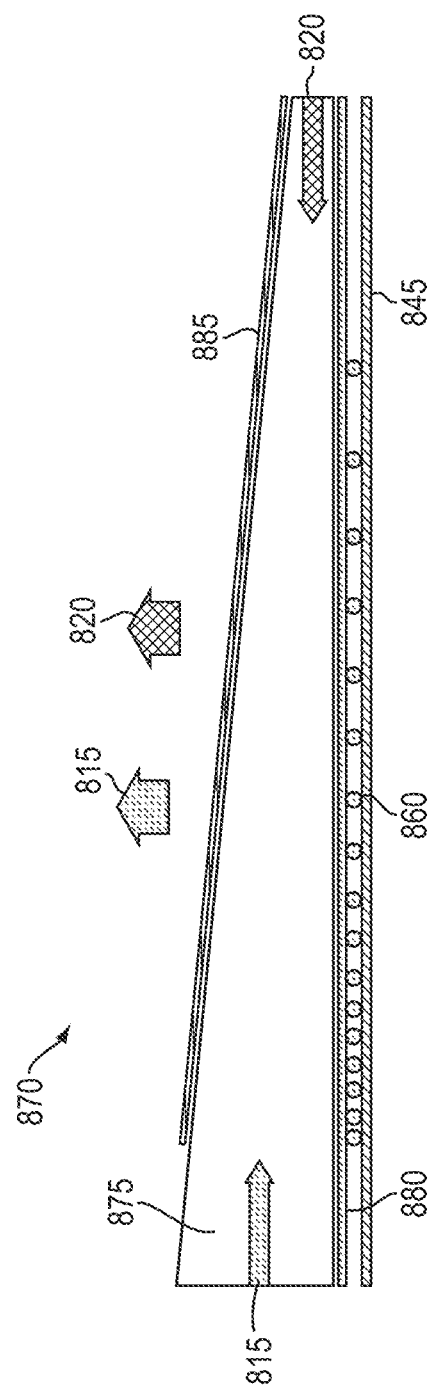
FIG. 8D is a schematic cross-sectional view of an illumination system in accordance with various embodiments of the invention.

FIG. 8D depicts portions of an illumination device 870 in which light 815 and light 820 are in-coupled into a single wedge-shaped waveguide 875 from opposite sides. As shown, device 870 also includes an optical filter 880 that reflects light 815 (e.g., blue light) while allowing light 820 (e.g., white light) to pass through, where light 820 can interact with out-coupling elements 860 for out-coupling out of the device. Optical band-pass filters are conventional, and an optical filter configured to reflect and/or transmit various wavelengths of light may be selected or provided by one of skill in the art without undue experimentation. Such filters may include, consist essentially of, or consist of one or more layers (e.g., as a coating) of dielectric materials, where the material and thickness of each layer is selected to reflect or transmit a certain wavelength band. In an embodiment in which light 820 is white light that has large bandwidth (>100 nm) and light 815 is single color like red and therefor has narrow bandwidth (<50 nm), it may be more efficient to have the filter reflect or transmit the light that has the narrower band. For example, as shown in FIG. 8D, light 820 is white light and has large bandwidth, while light 815 is monochromatic and has narrow bandwidth. In such embodiments, the optical filter 880 may be configured to reflect light having the wavelengths of light 815 while allowing other wavelengths to pass through the filter.

Thus, as shown, the out-coupling elements 860 may be configured for out-coupling of light 820 propagating from right to left, i.e., their size, density, and/or concentration may increase as a function away from the source of light 820. Since light 815 is prevented from interaction with out-coupling elements 860, it is out-coupled due to loss of TIR as it propagates toward the smaller (e.g., thinner) portion of the waveguide 875. In various embodiments, light 815 and light 820 may be in-coupled from the opposite sides of waveguide 875 from the configuration depicted in FIG. 8D, and an optical filter that is transparent to light 815 (and, e.g., reflective to light 820) may be utilized for out-coupling uniformity. As in other embodiments, a reflector 845 may be provided at the bottom surface of waveguide 875 to prevent light leakage therefrom. As also shown, device 870 may also incorporate a light-redirection element 885 over at least a portion of the top surface of the waveguide. In various embodiments, the light-redirection element 885 may include, consist essentially of, or consist of a diffuser and/or prismatic film such as Brightness Enhancement Film available from 3M. In various embodiments, light out-coupled from wedge-shaped waveguides may propagate at a relatively shallow angle, and light-redirection element 885 may redirect the light to propagate substantially perpendicular to the top of device 870 (i.e., upwards as shown by the large arrows 815, 820 at the top of the device, rather than perpendicular to the angled top surface of waveguide 875).

In embodiments of the invention in which both blue light and white light are coupled into a waveguide, it may be preferable for the blue component of the white light (e.g., the blue LED being wavelength converted by a phosphor material to produce the white light) and the unconverted blue LED to have different peak wavelengths so that wavelength-dependent out-coupling elements configured to interact with the blue light will have substantially no effect on the blue component of the white light. This is similar to the situation detailed above with reference to FIG. 2A.

Various embodiments of the invention may also utilize multiple wedge-shaped waveguides for improved uniformity of out-coupled light, even when the light in-coupled into the device from different directions is substantially the same color. FIGS. 8E and 8F depict different configurations of an illumination device 890 utilizing two wedge-shaped waveguides 895. In the configuration depicted in FIG. 8E, light 820 (e.g., white light) is in-coupled into opposite ends of device 890 at the larger ends of each of the wedge-shaped waveguide 895. The light from each waveguide is out-coupled from device 890 via both loss of TIR and interaction with out-coupling elements 860. As discussed previously, a reflector 845 may be provided to preferentially redirect light to be emitted only from the top surface of the device.

In the embodiment depicted in FIG. 8F, the waveguides 895 are offset from each other so that they only incompletely overlap, and portions of the waveguides not overlapping each other are covered with reflectors 845 to prevent light emission from such areas. In this embodiment, the in-coupled light is emitted from LEDs 897 (e.g., blue LEDs), which interacts with phosphor material 898 to produce mixed light (e.g., white light) for out-coupling from the device. As in the embodiment of FIG. 8E, the light is emitted via both loss of TIR and interaction with out-coupling elements 860, and a reflector 845 may be provided to preferentially redirect light to be emitted only from the top surface of the device.

Figure 9:
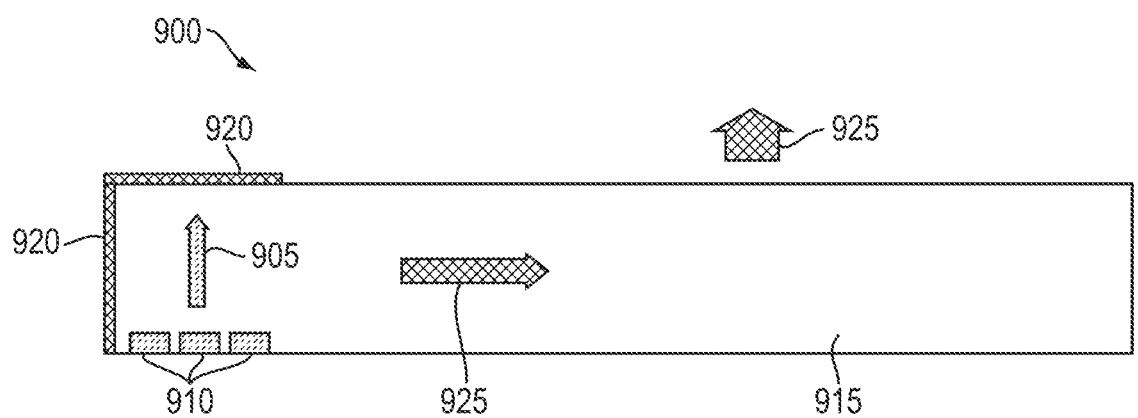
FIG. 9 is a schematic cross-sectional view of an illumination system in accordance with various embodiments of the invention.

Various embodiments of the present invention increase the amount of light emitted from illumination devices by utilizing multiple LEDs (see, for example, FIGS. 5B and 5C). FIG. 9 is a cross-sectional schematic of portions of an illumination device 900 in which the light 905 (e.g., blue light) from an array of LEDs 910 is coupled into a waveguide 915. Since FIG. 9 is a cross-section, each LED 910 depicted in the figure may represent a row of multiple LEDs 910. As shown, the LEDs 910 may be embedded within the waveguide 915. The light 905 may interact with a phosphor material 920 to form mixed light 925 (e.g., white light), which is out-coupled from the device 900. Reflectors may be disposed over some or all of the phosphor material 920 to prevent light leakage therethrough.

Figure 10A:
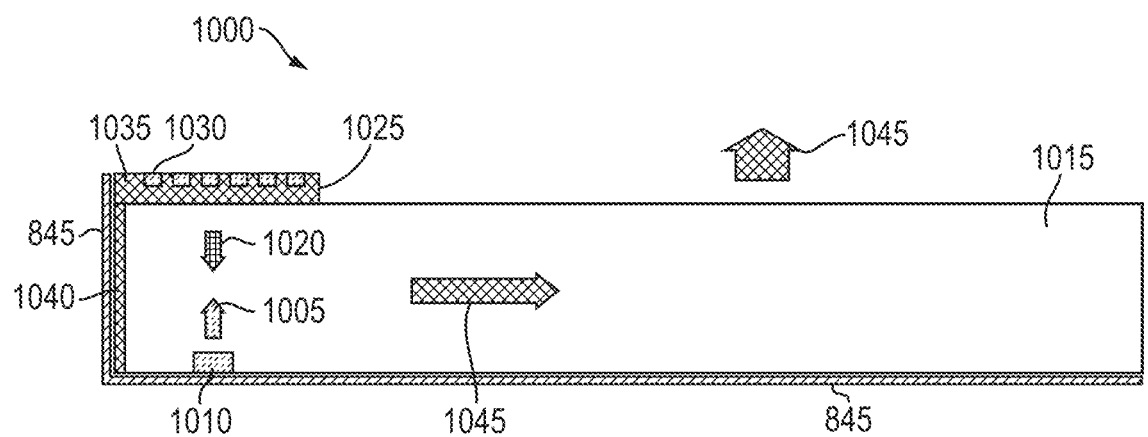
FIG. 10A is a schematic cross-sectional view of an illumination system in accordance with various embodiments of the invention.

Various embodiments of the invention increase the amount of light emitted from illumination devices by utilizing discrete illumination modules that include therewithin multiple LEDs (e.g., LED chips). For example, FIG. 10A depicts portions of an illumination device 1000 in which not only light 1005 from an LED 1010 (e.g., a blue LED) is in-coupled into a waveguide 1015, but also light 1020 from an illumination module 1025 is in-coupled into the waveguide 1015. In various embodiments, the illumination module 1025 may include, consist essentially of, or consist of multiple LEDs (e.g., LED chips) 1030 embedded within and/or otherwise coupled to a phosphor material 1035. The illumination module 1025 may also include a shared substrate or reflector on the surface opposite that utilized for light emission. In some embodiments, the illumination module 1025 may include, consist essentially of, or consist of a chip-on-board LED module, which are commercially available. The light 1005 may interact with the phosphor material 1035 and/or phosphor material 1040 to form mixed light (e.g., white light) that also mixes with light 1020 to form mixed light (e.g., white light) 1045, which is out-coupled from the waveguide 1015. In various embodiments, all or a portion of light 1020 results from the interaction of the light from the LEDs within the illumination module 1025 and the phosphor material 1035, and the light 1020 may be white light. Light 1020 may be mixed with additional light to form mixed light 1045, and mixed light 1045 may also be white light but with one or more optical properties (e.g., CCT) different from those of light 1020. As shown, one or more reflectors 845 may also be utilized to prevent unwanted light leakage from the device 1000.

Figure 10B:
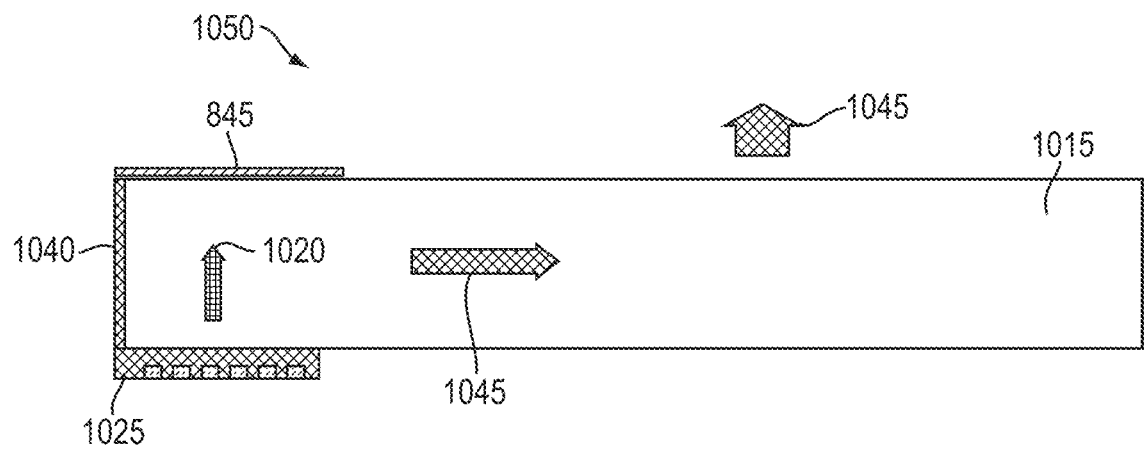
FIG. 10B is a schematic cross-sectional view of an illumination system in accordance with various embodiments of the invention.

In the illumination device 1050 in accordance with embodiments of the invention depicted in FIG. 10B, the only light in-coupled into the waveguide 1015 is emitted by the illumination module 1025. A portion of the light 1020 may even interact with phosphor 1040 to form the mixed light 1045 that is emitted from the waveguide 1015. In other embodiments, the light 1020 merely spreads within the waveguide 1015 as it propagates to form the light 1045. A reflector 845 facilitates confinement of the light within the waveguide 1015.

Figure 10C:
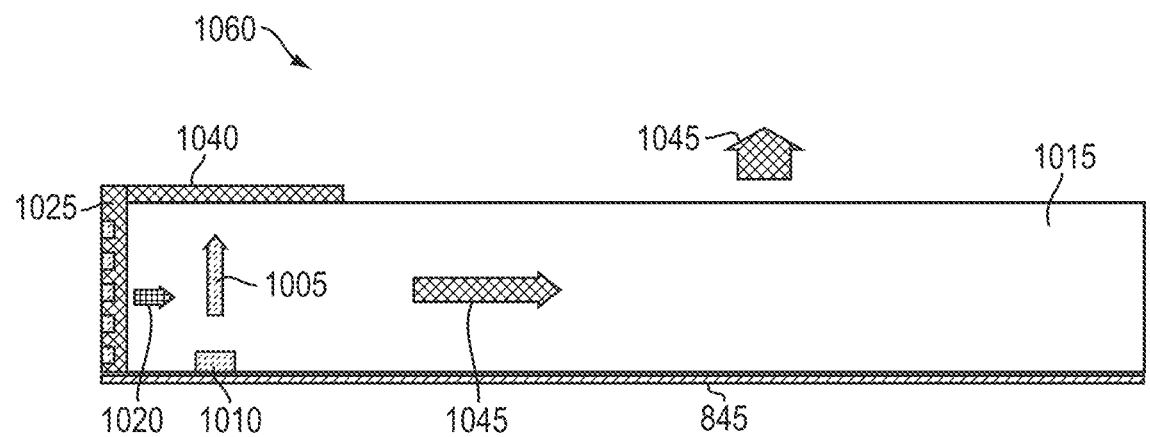
FIG. 10C is a schematic cross-sectional view of an illumination system in accordance with various embodiments of the invention.

FIG. 10C depicts portions of an illumination device 1060 in accordance with embodiments of the invention similar to device 1000 of FIG. 10A, but the embedded LED 1010 emits light toward a top phosphor material 1040 while the illumination module 1025 emits light 1020 from the side of the waveguide 1015. As in device 1000, the resulting mixed light 1045 is emitted from an out-coupling region of the waveguide 1015 (e.g., a portion of the top surface of the waveguide).

Figure 10D:
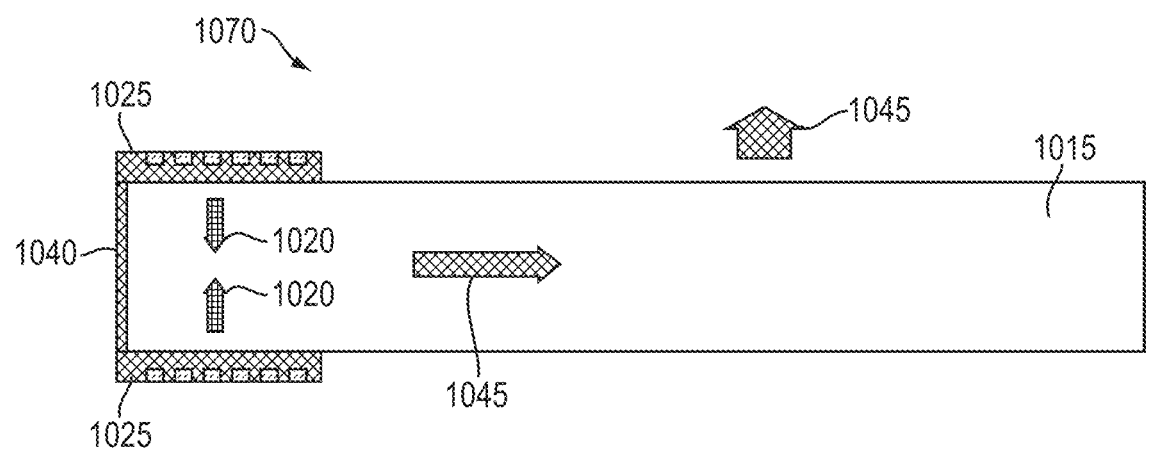
FIG. 10D is a schematic cross-sectional view of an illumination system in accordance with various embodiments of the invention.

FIG. 10D depicts portions of an illumination device 1070 in accordance with embodiments of the invention in which multiple illumination modules 1025 are utilized to in-couple light 1020 into the waveguide 1015 from different locations and/or in different directions. As in device 1050, a portion of the light 1020 may interact with phosphor 1040 (or the phosphor 1035 of the opposing illumination module), and the resulting mixed light 1045 may be emitted from the waveguide 1015. In any of the embodiments of FIGS. 10A-10D, phosphor materials may be supplemented or replaced by reflector layers for confinement of light within the waveguide.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

The invention claimed is:

1. An illumination device comprising:
a solid waveguide having a first surface, a second surface opposite the first surface, and a third surface spanning the first and second surfaces;
a first LED configured to emit light of a first wavelength and embedded within the waveguide proximate the first surface, such that light from the first LED is coupled into the first surface of the waveguide;
a prism, disposed proximate the second surface of the waveguide above the first LED, for reflecting light emitted by the first LED into the waveguide; and
a plurality of second LEDs each butt-coupled to the third surface of the waveguide, such that light from each second LED is coupled into the third surface of the waveguide,
wherein the waveguide has an out-coupling region from which mixed light is emitted, the mixed light comprising light emitted from the first LED and the plurality of second LEDs.

2. The illumination device of claim 1, wherein the first wavelength is a wavelength of blue light and the plurality of second LEDs emit white light.

3. An illumination device comprising:
a solid waveguide having a first surface, a second surface opposite the first surface, and a third surface spanning the first and second surfaces;
a first LED configured to emit light of a first wavelength and positioned such that light from the first LED is coupled into the first surface of the waveguide;
a first phosphor material, configured to convert light from the first LED to light of a different wavelength, disposed on the second surface of the waveguide;
a second LED configured to emit light of a second wavelength, different from the first wavelength, and positioned such that light from the second LED is coupled into the first surface of the waveguide; and
a prism disposed at the second surface of the waveguide and positioned to reflect at least some of the light emitted by the second LED away from the first phosphor material while not reflecting light emitted by the first LED away from the first phosphor material,
wherein the waveguide has an out-coupling region from which mixed light is emitted, the mixed light comprising light emitted from the second LED and light wavelength-converted by the first phosphor material.

4. The illumination device of claim 3, wherein the first and second wavelengths are different wavelengths of blue light.

5. The illumination device of claim 3, wherein the first phosphor material is not in optical contact with the second surface of the waveguide.

6. The illumination device of claim 3, wherein the first phosphor material is in optical contact with the second surface of the waveguide.

7. The illumination device of claim 3, further comprising a second phosphor material, configured to convert light from the first LED to light of a different wavelength, disposed on the third surface of the waveguide.

8. The illumination device of claim 3, wherein the out-coupling region is a portion of the second surface of the waveguide.

9. The illumination device of claim 3, wherein at least one of the first LED or the second LED is embedded within the waveguide.

10. An illumination device comprising:
a solid waveguide having a first surface, a second surface opposite the first surface, and a third surface spanning the first and second surfaces;
a first LED configured to emit light of a first wavelength and embedded within the waveguide proximate the first surface, such that light from the first LED is coupled into the first surface of the waveguide;
a second LED configured to emit light of a second wavelength, different from the first wavelength, and butt-coupled to the third surface of the waveguide, such that light from the second LED is coupled into the third surface of the waveguide;
a first phosphor material, configured to convert light from the first LED to light of a different wavelength, disposed on the second surface of the waveguide; and a second phosphor material, configured to convert light from the first LED to light of a different wavelength, disposed on the third surface of the waveguide, wherein the waveguide has an out-coupling region from which mixed light is emitted, the mixed light comprising light emitted from the second LED and light wavelength-converted by the first and second phosphor materials.

11. The illumination device of claim 10, wherein the first and second wavelengths are different wavelengths of blue light.

12. The illumination device of claim 10, wherein the first phosphor material is not in optical contact with the second surface of the waveguide.

13. The illumination device of claim 10, wherein the second phosphor material is in optical contact with the third surface of the waveguide.

14. The illumination device of claim 10, further comprising a filter disposed between the second LED and the waveguide, the filter configured to transmit light of the second wavelength while reflecting other wavelengths of light.

15. The illumination device of claim 10, further comprising, within the waveguide, a reflector positioned to prevent light emitted by the first LED from propagating away from the first phosphor material or the second phosphor material.

16. The illumination device of claim 10, wherein the first and second phosphor materials comprise the same phosphor material.

17. The illumination device of claim 10, further comprising one or more third LEDs each configured to emit light of a third wavelength different from the first and second wavelengths, wherein the mixed light emitted from the out-coupling region comprises light from the one or more third LEDs.

18. The illumination device of claim 17, wherein the third wavelength is a wavelength of red light.

19. The illumination device of claim 17, wherein the one or more third LEDs are each butt-coupled to the third surface of the LED.

20. The illumination device of claim 17, wherein the out-coupling region is a portion of the second surface of the waveguide.

* * * * *